(12) United States Patent
Hiramoto et al.

(10) Patent No.: US 11,816,195 B2
(45) Date of Patent: Nov. 14, 2023

(54) INFORMATION PROCESSING APPARATUS, INFORMATION PROCESSING METHOD, AND STORAGE MEDIUM

(71) Applicant: NEC CORPORATION, Tokyo (JP)

(72) Inventors: Noriyuki Hiramoto, Tokyo (JP); Kazuyoshi Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 197 days.

(21) Appl. No.: 16/652,612

(22) PCT Filed: Aug. 14, 2019

(86) PCT No.: PCT/JP2019/031979
§ 371 (c)(1),
(2) Date: Mar. 31, 2020

(87) PCT Pub. No.: WO2021/029047
PCT Pub. Date: Feb. 18, 2021

(65) Prior Publication Data
US 2021/0342428 A1    Nov. 4, 2021

(51) Int. Cl.
*G06F 21/00* (2013.01)
*G06F 21/32* (2013.01)
(Continued)

(52) U.S. Cl.
CPC ............ *G06F 21/32* (2013.01); *G06F 21/604* (2013.01); *G06Q 50/10* (2013.01); *G06V 40/168* (2022.01); *G06V 40/175* (2022.01); *G07B 11/00* (2013.01)

(58) Field of Classification Search
CPC ....... G06F 21/32; G06F 21/604; G06Q 50/10; G06V 40/168; G06V 40/175; G07B 11/00; G07C 9/257
See application file for complete search history.

(56) References Cited

U.S. PATENT DOCUMENTS 6,085,321 A * 7/2000 Gibbs ................ G06Q 20/3821
  705/76
6,108,636 A * 8/2000 Yap ........................ G06Q 10/02
  705/5
(Continued)

FOREIGN PATENT DOCUMENTS

CN    101977383 A  *  2/2011
CN    104615926 A  *  5/2015  ........... G06F 3/1273
(Continued)

OTHER PUBLICATIONS

W3schools, "SQL Tutorial", Dated Jan. 22, 2019 from Wayback Machine (Year: 2019).*
(Continued)

*Primary Examiner* — John B King
(74) *Attorney, Agent, or Firm* — Sughrue Mion, PLLC

(57) ABSTRACT

An information processing apparatus in the present invention includes: an acquisition unit that acquires first history information indicating that a procedure related to boarding of a passenger in an airport was performed with biometric authentication and second history information indicating that the procedure was performed with reading of a medium; and an output unit that outputs usage status of the biometric authentication in the procedure based on the first history information and the second history information.

14 Claims, 26 Drawing Sheets

(51) Int. Cl.
    *G06F 21/60*     (2013.01)
    *G06Q 50/10*     (2012.01)
    *G07B 11/00*     (2006.01)
    *G06V 40/16*     (2022.01)

(56) References Cited

U.S. PATENT DOCUMENTS

| | | | |
|---|---|---|---|
| 6,377,944 B1 * | 4/2002 | Busey | H04L 29/06 |
| 6,618,806 B1 * | 9/2003 | Brown | G06F 21/32 |
| | | | 709/225 |
| 9,245,175 B1 * | 1/2016 | Vladimir | G07C 9/37 |
| 9,619,633 B1 * | 4/2017 | Mortensen | G06F 21/32 |
| 2003/0158762 A1 * | 8/2003 | Wu | G06Q 50/265 |
| | | | 705/5 |
| 2004/0190757 A1 * | 9/2004 | Murphy | G07C 9/257 |
| | | | 382/115 |
| 2005/0065834 A1 | 3/2005 | Hale et al. | |
| 2005/0283823 A1 * | 12/2005 | Okajo | G06F 21/604 |
| | | | 726/1 |
| 2007/0288748 A1 * | 12/2007 | Kakiuchi | G06F 21/316 |
| | | | 713/159 |
| 2010/0060411 A1 | 3/2010 | Ikegami | |
| 2010/0148922 A1 * | 6/2010 | Yamada | G06K 9/6857 |
| | | | 340/5.82 |
| 2010/0245042 A1 | 9/2010 | Tsubaki | |
| 2012/0286931 A1 | 11/2012 | Semba | |
| 2012/0331479 A1 * | 12/2012 | Takagi | G06F 9/505 |
| | | | 718/105 |
| 2013/0002399 A1 * | 1/2013 | Frueh | G07C 9/257 |
| | | | 340/5.53 |
| 2013/0057918 A1 * | 3/2013 | Ohta | G06F 3/1205 |
| | | | 358/1.15 |
| 2014/0297529 A1 * | 10/2014 | Wallaja | G06Q 20/353 |
| | | | 705/44 |
| 2016/0337385 A1 * | 11/2016 | Fujishima | H04L 63/1425 |
| 2017/0046556 A1 * | 2/2017 | Kim | G06F 21/84 |
| 2017/0155643 A1 * | 6/2017 | Fujishima | H04L 63/0869 |
| 2018/0069896 A1 * | 3/2018 | Urmanov | H04L 63/1425 |
| 2019/0043148 A1 | 2/2019 | Vemury | |
| 2019/0190959 A1 * | 6/2019 | Yuan | G06F 21/604 |
| 2019/0220944 A1 | 7/2019 | Vemury | |
| 2019/0361697 A1 * | 11/2019 | Hu | G06F 11/3051 |
| 2022/0121734 A1 * | 4/2022 | Nakamura | G06F 21/32 |

FOREIGN PATENT DOCUMENTS

| | | | | |
|---|---|---|---|---|
| CN | 109615380 A | * | 4/2019 | |
| EP | 1619638 A1 | * | 1/2006 | G08B 13/1961 |
| EP | 2151786 A2 | * | 2/2010 | G06K 9/00 |
| FR | 3013138 A1 | * | 5/2015 | G06F 21/34 |
| JP | 11-224236 A | | 8/1999 | |
| JP | 2002140306 A | * | 5/2002 | |
| JP | 2003143136 A | * | 5/2003 | |
| JP | 2003-184381 A | | 7/2003 | |
| JP | 2003216260 A | * | 7/2003 | |
| JP | 2006-031341 A | | 2/2006 | |
| JP | 2006-259908 A | | 9/2006 | |
| JP | 2007-079656 A | | 3/2007 | |
| JP | 2007-122529 A | | 5/2007 | |
| JP | 2008-507790 A | | 3/2008 | |
| JP | 2008070926 A | * | 3/2008 | |
| JP | 4082028 B2 | * | 4/2008 | G06Q 20/102 |
| JP | 2009289060 A | * | 12/2009 | |
| JP | 2010-061517 A | | 3/2010 | |
| JP | 2010086478 A | * | 4/2010 | G06V 40/13 |
| JP | 2010-231397 A | | 10/2010 | |
| JP | 2010-257326 A | | 11/2010 | |
| JP | 2014-126948 A | | 7/2014 | |
| JP | 2019-095924 A | | 6/2019 | |
| JP | 2019-125164 A | | 7/2019 | |
| KR | 20100130832 A | * | 12/2010 | G07C 9/257 |
| WO | 2005/055151 A1 | | 6/2005 | |
| WO | WO-2008055181 A2 | * | 5/2008 | H04L 63/0861 |
| WO | 2009/075180 A | | 6/2009 | |
| WO | 2011/092829 A1 | | 5/2013 | |
| WO | 2017-078952 A | | 4/2017 | |
| WO | WO-2019226652 A1 | * | 11/2019 | G06F 9/5083 |

OTHER PUBLICATIONS

International Search Report for PCT/JP2019/031979 dated Nov. 12, 2019.

Extended European Search Report for EP Application No. EP19941253.7 dated Jul. 14, 2022.

Office Action dated Jun. 1, 2023 in Japanese Application No. 2022-041971.

* cited by examiner

FIG. 2

| No | ITEM |
|---|---|
| 1 | TOKEN ID |
| 2 | GROUP ID |
| 3 | FEATURE AMOUNT |
| 4 | REGISTERED FACE IMAGE |
| 5 | TOKEN ISSUANCE TIME |
| 6 | TOKEN ISSUANCE DEVICE NAME |
| 7 | INVALID FLAG |
| 8 | INVALIDATED TIME |

FIG. 3

| No | ITEM |
|---|---|
| 1 | PASSAGE HISTORY ID |
| 2 | PASSAGE TOUCH POINT |
| 3 | PASSAGE TIME |
| 4 | DEVICE NAME |
| 5 | OPERATION SYSTEM TYPE |
| 6 | TOKEN ID |
| 7 | RESERVATION NUMBER |
| 8 | AIRLINE CODE |

FIG. 4

| No | ITEM |
|---|---|
| 1 | AUTHENTICATION HISTORY ID |
| 2 | TOKEN ID |
| 3 | AUTHENTICATION TOUCH POINT |
| 4 | DEVICE NAME |
| 5 | LOCATION ID |
| 6 | AUTHENTICATION SCORE |
| 7 | AUTHENTICATION PROCESSING TIME |
| 8 | AUTHENTICATION RESULT |

FIG. 5

| No | ITEM |
|---|---|
| 1 | TOKEN ID |
| 2 | RESERVATION NUMBER |
| 3 | AIRLINE CODE |
| 4 | PASSENGER NAME |
| 5 | DEPARTURE PLACE |
| 6 | DESTINATION PLACE |
| 7 | FLIGHT NUMBER |
| 8 | DATE OF FLIGHT |
| 9 | SEAT NUMBER |
| 10 | SEAT CLASS |
| 11 | NATIONALITY |
| 12 | PASSPORT NUMBER |
| 13 | FAMILY NAME |
| 14 | FIRST NAME |
| 15 | DATE OF BIRTH |
| 16 | SEXUALITY |
| 17 | MEMBERSHIP CATEGORY |
| 18 | WITH OR WITHOUT ACCOMPANYING PERSON |
| 19 | ACCOMPANYING PERSON CATEGORY |

FIG. 6

| No | ITEM |
|---|---|
| 1 | RESERVATION NUMBER |
| 2 | AIRLINE CODE |
| 3 | PASSENGER NAME |
| 4 | DEPARTURE PLACE |
| 5 | DESTINATION PLACE |
| 6 | FLIGHT NUMBER |
| 7 | DATE OF FLIGHT |
| 8 | SEAT NUMBER |
| 9 | SEAT CLASS |
| 10 | NATIONALITY |
| 11 | PASSPORT NUMBER |
| 12 | FAMILY NAME |
| 13 | FIRST NAME |
| 14 | DATE OF BIRTH |
| 15 | SEXUALITY |
| 16 | MEMBERSHIP CATEGORY |
| 17 | WITH OR WITHOUT ACCOMPANYING PERSON |
| 18 | ACCOMPANYING PERSON CATEGORY |

INFORMATION PROCESSING APPARATUS, INFORMATION PROCESSING METHOD, AND STORAGE MEDIUM

CROSS REFERENCE TO RELATED APPLICATIONS

This application is a National Stage of International Application No. PCT/JP2019/031979 filed Aug. 14, 2019.

TECHNICAL FIELD

The present invention relates to an information processing apparatus, an information processing method, and a storage medium.

BACKGROUND ART

Patent Literature 1 discloses a ticket-less boarding system in which biometric information such as a face image is used as a boarding ticket to perform a procedure with the biometric information in a plurality of procedure areas (a security inspection site, an immigration site, a boarding gate, and the like) without a ticket medium being presented.

CITATION LIST

Patent Literature

PTL 1: Japanese Patent Application Laid-Open No. 2007-79656

SUMMARY OF INVENTION

Technical Problem

As illustrated in Patent Literature 1 as an example, in a current airport, a passenger arbitrarily chooses either one of a method with biometric authentication and a conventional method of causing a recording medium such as a boarding ticket to be read by a terminal apparatus and performs a procedure related to boarding on an airplane in accordance with the chosen method. However, to improve the throughput in the airport, there is a demand for further facilitating use of biometric authentication by passengers.

Accordingly, in view of the problem described above, the present invention intends to provide an information processing apparatus, an information processing method, and a storage medium that can facilitate use of biometric information in procedures related to boarding of passengers.

Solution to Problem

According to one example aspect of the present invention, provided is an information processing apparatus including: an acquisition unit that acquires first history information indicating that a procedure related to boarding of a passenger in an airport was performed with biometric authentication and second history information indicating that the procedure was performed with reading of a medium; and an output unit that outputs usage status of the biometric authentication in the procedure based on the first history information and the second history information.

According to another example aspect of the present invention, provided is an information processing method including: acquiring first history information indicating that a procedure related to boarding of a passenger in an airport was performed with biometric authentication and second history information indicating that the procedure was performed with reading of a medium; and outputting usage status of the biometric authentication in the procedure based on the first history information and the second history information.

According to yet another example aspect of the present invention, provided is a storage medium storing a program that causes a computer to perform: acquiring first history information indicating that a procedure related to boarding of a passenger in an airport was performed with biometric authentication and second history information indicating that the procedure was performed with reading of a medium; and outputting usage status of the biometric authentication in the procedure based on the first history information and the second history information.

Advantageous Effects of Invention

According to the present invention, it is possible to provide an information processing apparatus, an information processing method, and a storage medium that can facilitate use of biometric authentication in procedures related to boarding of passengers.

BRIEF DESCRIPTION OF DRAWINGS

FIG. 2 is a diagram illustrating one example of information stored in a token ID information database in the first example embodiment.

FIG. 3 is a diagram illustrating one example of information stored in a passage history information database in the first example embodiment.

FIG. 4 is a diagram illustrating one example of information stored in an authentication history information database in the first example embodiment.

FIG. 5 is a diagram illustrating one example of information stored in an operation information database in the first example embodiment.

FIG. 6 is a diagram illustrating one example of information stored in a reservation information database in the first example embodiment.

DESCRIPTION OF EMBODIMENTS

Illustrative example embodiments of the present invention will be described below with reference to the drawings. Throughout the drawings, the same components or corresponding components are labeled with the same references, and the description thereof may be omitted or simplified.

First Example Embodiment

Figure 1:
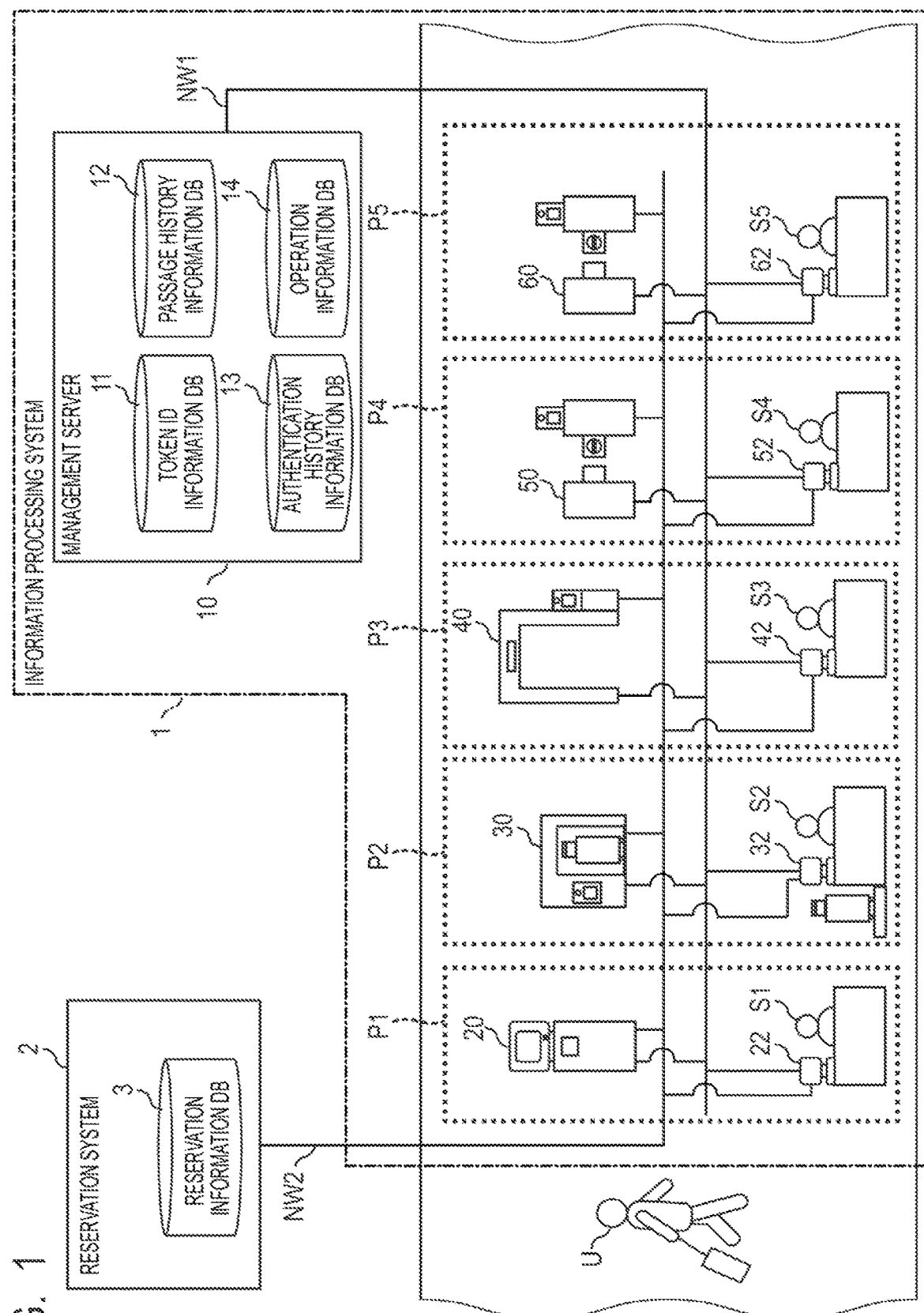
FIG. 1 is a block diagram illustrating a general configuration example of an information processing system in a first example embodiment.

FIG. 1 is a block diagram illustrating an example of the overall configuration of an information processing system 1 in the present example embodiment. The information processing system 1 is a computer system that manages and supports an operation related to an inspection procedure at immigration to a user (hereafter, referred to as a "passenger") U at an airport A. The information processing system 1 is operated by a public institution such as an office of administration of immigration or a consignee consigned for the operation of the institution, for example. Unlike the information processing system 1, a reservation system 2 is a computer system provided in an airline company. The reservation system 2 includes a reservation information database 3 that manages boarding reservation information. Note that, although only one reservation system 2 is illustrated for simplified illustration in FIG. 1, the reservation system 2 is provided for each of a plurality of airline companies.

In the information processing system 1 of the present example embodiment, a check-in terminal 20, an automatic baggage drop-off machine 30, a security inspection apparatus 40, an automated gate apparatus 50, and a boarding gate apparatus 60 are connected to a common management server 10 via the network NW1, respectively.

Similarly, in the reservation system 2 of each airline company, the check-in terminal 20, the automatic baggage drop-off machine 30, the security inspection apparatus 40, the automated gate apparatus 50, and the boarding gate apparatus 60 are connected to a server (not illustrated) via the network NW2, respectively. Operation terminals 22 (32, 42, 52, 62) used by staff members S1 to S5 are connected to the management server 10 via the network NW1 and connected to a server of the reservation system 2 via the network NW2, respectively. Note that each operation terminal 22 (32, 42, 52, 62) may be connected to the networks NW1 and NW2 via access points (not illustrated).

The networks NW1 and NW2 are formed of a local area network (LAN) including LAN of the airport A, a wide area network (WAN), a mobile communication network, or the like. The connection scheme is not limited to a wired scheme but may be a wireless scheme. The networks NW1 and NW2 are different networks from each other. That is, in the present example embodiment, the information processing system 1 is not directly connected to the reservation system 2.

The management server 10 is provided in a facility of an airport company or the like that runs the airport A, for example. Note that the management server 10 may be a cloud server instead of a server installed in a facility where an operation is actually provided. Further, the management server 10 is not necessarily required to be a single server but may be an entity formed as a server group including a plurality of servers.

As illustrated in FIG. 1, inspection procedures at departure from the country in the airport A are sequentially performed at five touch points P1 to P5. The relationship between respective apparatuses and the touch points P1 to P5 will be described below.

The check-in terminal 20 is installed in a check-in lobby (hereafter, referred to as "touch point P1") in the airport A. The check-in terminal 20 is a self-service terminal by which the user U performs a check-in procedure (boarding procedure) by himself/herself. Further, the operation terminal 22 is installed in a manned counter in the check-in lobby. The staff member S1 uses the operation terminal 22 in order to perform a check-in procedure of the user U. The check-in procedure is a procedure to register information used for identifying the user U who is going to board an airplane. Upon completion of the procedure at the touch point P1, the user U moves to a baggage counter or a security inspection site.

The automatic baggage drop-off machine 30 is installed at a baggage counter (hereafter, referred to as "touch point P2") in the airport A. The automatic baggage drop-off machine 30 is a self-service terminal which is operated by the user U by himself/herself to perform a procedure of dropping off baggage that is not carried in an airplane (baggage drop-off procedure). Further, the operation terminal 32 is installed in a manned baggage counter. The staff member S3 uses the operation terminal 32 in order to perform a baggage drop-off procedure of the user U. Upon completion of the procedure at the touch point P2, the user U moves to a security inspection site. Note that, when the user U does not drop off his/her baggage, the procedure at the touch point P2 is omitted.

The security inspection apparatus 40 is installed in a security inspection site (hereafter, referred to as "touch point P3") in the airport A. The security inspection apparatus 40 is an apparatus that uses a metal detector to check whether or not the user U wears a metal that may be a dangerous object. Note that the term "security inspection apparatus" in the present example embodiment is used as a meaning including an X-ray inspection apparatus that uses an X-ray to check whether or not there is a dangerous object in carry-on baggage or the like, a terminal apparatus of a passenger reconciliation system (PRS) that determines whether or not to permit passage of the user U at the entrance of a security inspection site, or the like without being limited to a metal detector. The user U who completes a check-in procedure or an automatic baggage drop-off procedure goes through a security inspection procedure by the security inspection apparatus 40 in the security inspection site. Upon completion of the procedure at the touch point P3, the user U moves to an immigration site.

The automated gate apparatus 50 is installed in an immigration site (hereafter, referred to as "touch point P4") in the airport A. The automated gate apparatus 50 is an apparatus that automatically performs an immigration procedure of the user U. Further, the operation terminal 52 is installed in a manned counter in the immigration site. The staff member S4 uses the operation terminal 52 in order to perform an immigration procedure of the user U. Upon completion of the procedure at the touch point P4, the user U moves to a departure area in which a duty-free shop and a boarding gate are provided.

The boarding gate apparatus 60 is a passage control apparatus installed for each boarding gate (hereafter, referred to as "touch point P5") in the departure area. The boarding gate apparatus 60 confirms that the user U is a passenger of an airplane who is allowed to board via the boarding gate. Further, the operation terminal 62 is installed in a manned counter at a boarding gate. The staff member S5 uses the operation terminal 62 in order to perform a boarding procedure for the user U to board an airplane. Upon completion of the procedure at the touch point P5, the user U boards the airplane and departs from the country.

As illustrated in FIG. 1, the management server 10 has a token ID information DB 11, a passage history information DB 12, an authentication history information DB 13, and an operation information DB 14. Note that databases included in the management server 10 are not limited to the above databases.

FIG. 2 is a diagram illustrating one example of information stored in the token ID information DB 11. The token ID information DB 11 has data items of "token ID", "group ID", "feature amount", "registered face image", "token issuance time", "token issuance device name", "invalid flag", and "invalidated time". The token ID is an identifier that uniquely identifies ID information. In the present example embodiment, the token ID is temporarily issued provided that there is a matching in a matching result between a passport face image read from a passport at the touch point P1 and a face image obtained by capturing the user U having the passport. Then, when the user U finishes a procedure at the touch point P5 (boarding gate), the token ID is invalidated. That is, the token ID is a onetime ID having a lifetime (life cycle).

The group ID is an identifier used for grouping ID information. The feature amount is a value extracted from biometric information. For example, the same group ID is set for the user U having an accompanying person or the users U of a party traveler. The registered face image is a face image registered for the user U. The term of biometric information in the present example embodiment means a face image and a feature amount extracted from the face image. Note that the biometric information is not limited to a face image and a face feature amount. That is, a fingerprint image, a palm-print image, a pinna image, an iris image, or the like may be used as the biometric information of the user U to perform biometric authentication.

The token issuance time is the time when the management server 10 issues a token ID. The token issuance device name is a name of a device from which a registered face image that triggers issuance of a token ID is acquired. The invalid flag is flag information indicating whether or not the token ID is currently valid. Once a token ID is issued, the invalid flag becomes a value of "1" indicating that the token ID is valid. Further, once a predetermined condition is satisfied, the invalid flag is updated to a value of "0" indicating that the token ID is invalid. The invalidated time is a timestamp when the invalid flag is disabled.

FIG. 3 is a diagram illustrating one example of information stored in the passage history information DB 12. The passage history information DB 12 has data items of "passage history ID", "passage touch point", "passage time", "device name", "operation system type", "token ID", "reservation number", and "airline code". The passage history ID is an identifier that uniquely identifies passage history information. The passage touch point corresponds to each name of the touch points P1 to P5 where the user U has passed. The passage time corresponds to each timestamp when the user U has passed by each of the touch points P1 to P5. The device name is a model name of an operation terminal used in each procedure at the touch points P1 to P5. The operation system type is a type of an operation system to which an operation terminal belongs. Note that, by extracting the passage history information on a token ID basis, the management server 10 can recognize up to which touch point the user U has completed the procedure. Further, in the present example embodiment, the reservation number and the airline code are data items that are stored instead of the token ID when a recording medium such as a boarding ticket is read to perform a procedure at a touch point. That is, passage history information is registered in the passage history information DB 12 for both cases where the procedure at each of the touch points P1 to P5 is performed with a method in accordance with biometric authentication and where the procedure is performed with a conventional method of reading a recording medium.

FIG. 4 is a diagram illustrating one example of information stored in the authentication history information DB 13. The authentication history information DB 13 has data items of "authentication history ID", "token ID", "authentication touch point", "device name", "location ID", "authentication score", "authentication processing time", and "authentication result" (success/failure of biometric authentication). The authentication history ID is an identifier that uniquely identifies authentication history information. The authentication touch point corresponds to the name of a touch point at which an authentication process is performed. The device name is a model name (device information) of a terminal apparatus used in biometric authentication at the touch points P1 to P5. The location ID is an identifier (location information) that uniquely identifies respective sections in which terminal apparatuses are arranged at the touch points P1 to P5. Note that, since a token ID is included in authentication history information, the token ID can be used as a key to acquire attribute information on a passenger from the operation information DB 14 described later. Further, attribute information on a passenger (age, sexuality, membership category, nationality, or the like) may be stored in the authentication history information.

FIG. 5 is a diagram illustrating one example of information stored in the operation information DB 14. The operation information DB 14 has data items of "token ID", "reservation number", "airline code", "passenger name", "departure place", "destination place", "flight number", "date of flight", "seat number", "seat class" (for example, first class/business class/economy class), "nationality", "passport number", "family name", "first name", "date of birth", "sexuality", "membership category", "with or without accompanying person" (for example, an infant, a young child, a person needing a helper, or the like), and "accompanying person category". The reservation number is an identifier that uniquely identifies reservation information regarding boarding to an airplane. The airline code is an identifier that uniquely identifies an airline company.

FIG. 6 is a diagram illustrating one example of information stored in the reservation information DB 3. The reservation information DB 3 has data items of "reservation number", "airline code", "passenger name", "departure place", "destination place", "flight number", "date of flight", "seat number", "seat class", "nationality", "passport number", "family name", "first name", "date of birth", "sexuality", "membership category", "with or without accompanying person", and "accompanying person category".

In the present example embodiment, once a terminal apparatus at each touch point (the check-in terminal 20 or the like) reads a reservation number and an airline code from an airline ticket medium presented by the user U, the terminal apparatus can inquire boarding reservation information from the reservation system 2 of an airline company corresponding to the airline code based on the reservation number. Note that a method of inquiring boarding reservation information from the reservation system 2 is not limited thereto.

Further, after a token ID and a face image of the user U are registered in the token ID information DB 11, boarding reservation information acquired from the reservation information DB 3 is associated with the token ID and registered in the operation information DB 14. Thereby, a terminal apparatus at each touch point can acquire operation information including boarding reservation information from the operation information DB 14 by using the token ID as a key and use the acquired operation information in a procedure at each touch point.

Next, with reference to FIG. 7 to FIG. 13, an example of a hardware configuration of each apparatus forming the information processing system 1 will be described. Note that, since devices whose names are the same but references only are different in FIG. 7 to FIG. 13 are devices having a similar function, detailed description thereof will be omitted in the subsequent drawings.

Figure 7:
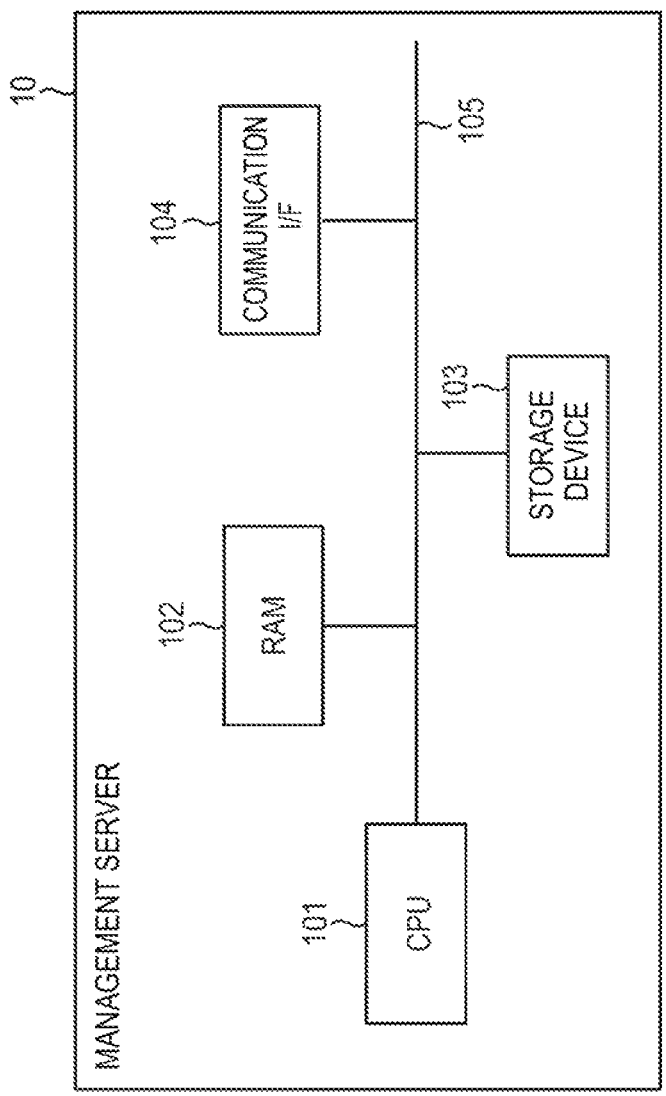
FIG. 7 is a block diagram illustrating one example of a hardware configuration of a management server in the first example embodiment.

FIG. 7 is a block diagram illustrating one example of a hardware configuration of the management server 10. As illustrated in FIG. 7, the management server 10 has a central processing unit (CPU) 101, a random access memory (RAM) 102, a storage device 103, and a communication I/F 104. Each device is connected to a bus line 105.

The CPU 101 is a processor that has a function of performing a predetermined operation in accordance with a program stored in the storage device 103 and controlling each component of the management server 10. The RAM 102 is formed of a volatile storage medium and provides a temporary memory area required for the operation of the CPU 101.

The storage device 103 is formed of a storage medium such as a nonvolatile memory, a hard disk drive, or the like and functions as a storage unit. The storage device 103 stores a program executed by the CPU 101, data referenced by the CPU 101 when the program is executed, or the like.

The communication I/F 104 is a communication interface based on a standard such as Ethernet (registered trademark), Wi-Fi (registered trademark), 4G, or the like, which is a module used for communicating with the check-in terminal 20 or the like.

Figure 8:
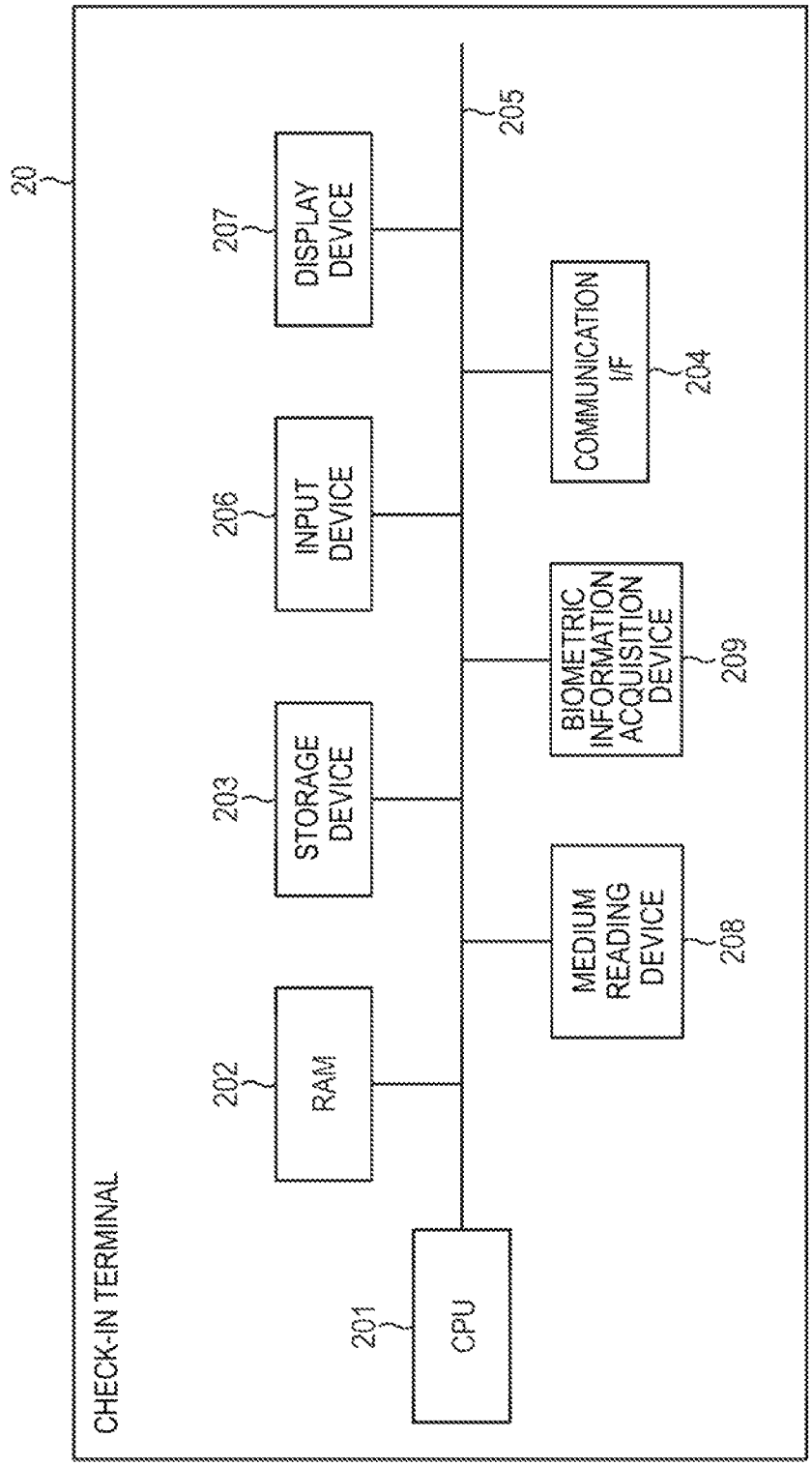
FIG. 8 is a block diagram illustrating one example of a hardware configuration of a check-in terminal in the first example embodiment.

FIG. 8 is a block diagram illustrating one example of a hardware configuration of the check-in terminal 20. As illustrated in FIG. 8, the check-in terminal 20 has a CPU 201, a RAM 202, a storage device 203, a communication I/F 204, an input device 206, a display device 207, a medium reading device 208, and a biometric information acquisition device 209. Each device is connected to a bus line 205.

The input device 206 is a pointing device such as a touch panel, a keyboard, or the like, for example. The display device 207 is a liquid crystal display device, an organic light emitting diode (OLED) display device, or the like and used for display of a moving image, a static image, a text, or the like. In the check-in terminal 20 of the present example embodiment, the input device 206 and the display device 207 are integrally formed as a touch panel.

The medium reading device 208 is a device that reads a passport or an airline ticket medium of the user U and acquires information recorded on the passport or the airline ticket. The airline ticket medium may be, for example, a paper airline ticket, a mobile terminal that displays a duplicate of an e-ticket, or the like. The medium reading device 208 is formed of a code reader, an image scanner, a contactless integrated circuit (IC) reader, an optical character reader (OCR) device, or the like, for example, and acquires information from various media held over the reading unit thereof.

The biometric information acquisition device 209 is a device that acquires a face image of the user U as biometric information of the user U. For example, the biometric information acquisition device 209 is a digital camera that captures a face of the user U standing in front of the check-in terminal 20, and the biometric information acquisition device 209 captures a face of the user U and acquires a face image.

Figure 9:
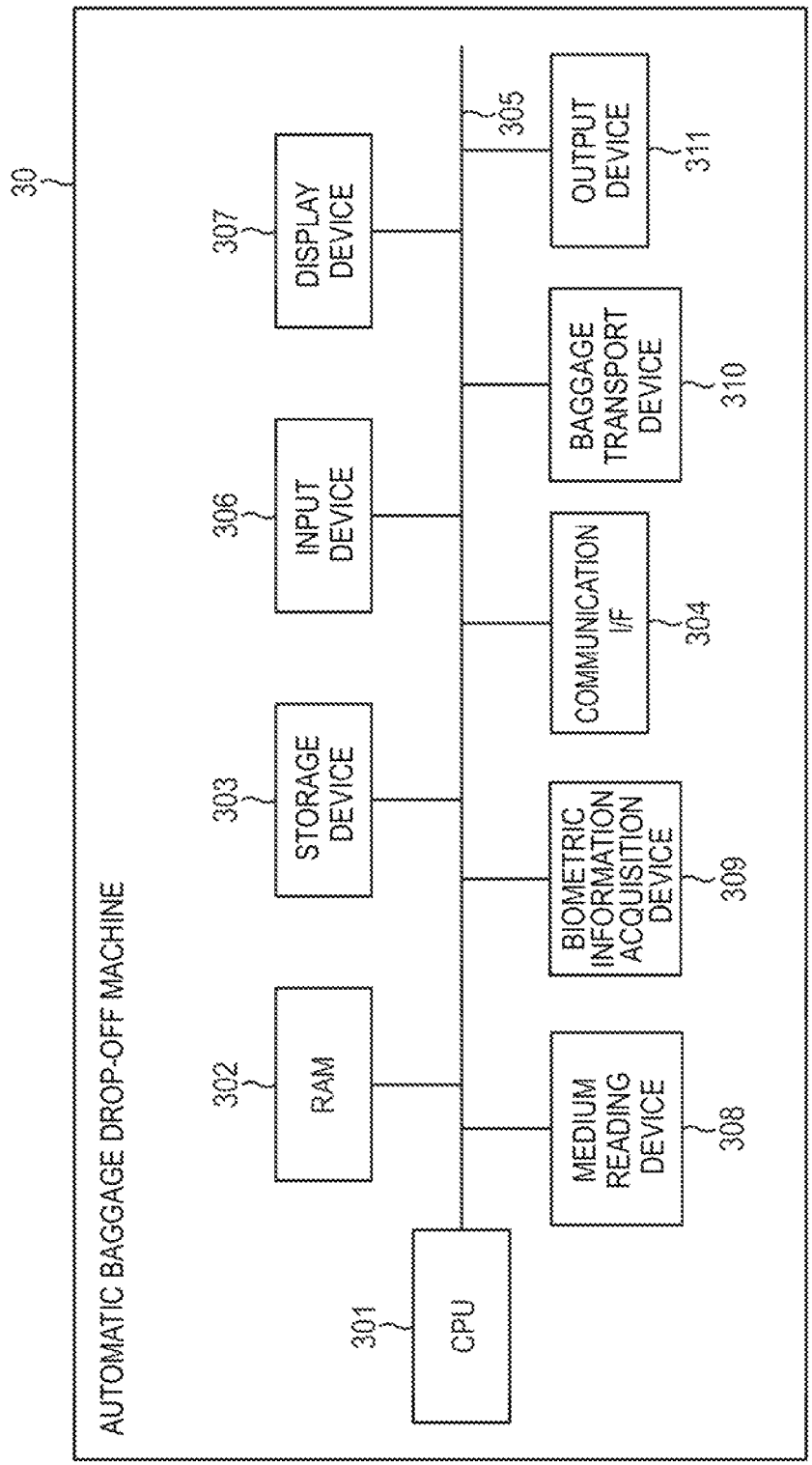
FIG. 9 is a block diagram illustrating one example of a hardware configuration of an automatic baggage drop-off machine in the first example embodiment.

FIG. 9 is a block diagram illustrating one example of a hardware configuration of the automatic baggage drop-off machine 30. As illustrated in FIG. 9, the automatic baggage drop-off machine 30 has a CPU 301, a RAM 302, a storage device 303, a communication I/F 304, an input device 306, a display device 307, a medium reading device 308, a biometric information acquisition device 309, a baggage transport device 310, and an output device 311. Each device is connected to a bus line 305.

The baggage transport device 310 transports baggage of the user U in order to load the baggage to an airplane that the user U is boarding when the identity verification of the user U is successful. The baggage transport device 310 transports baggage that is placed on a reception part by the user U and attached with a baggage tag to a cargo handling section.

The output device 311 is a device that outputs a baggage tag to be attached to dropped-off baggage. Further, the output device 311 outputs a baggage claim tag required for claiming baggage after arriving at the destination. Note that a baggage tag or a baggage claim tag is associated with at least one of passport information and boarding information.

Figure 10:
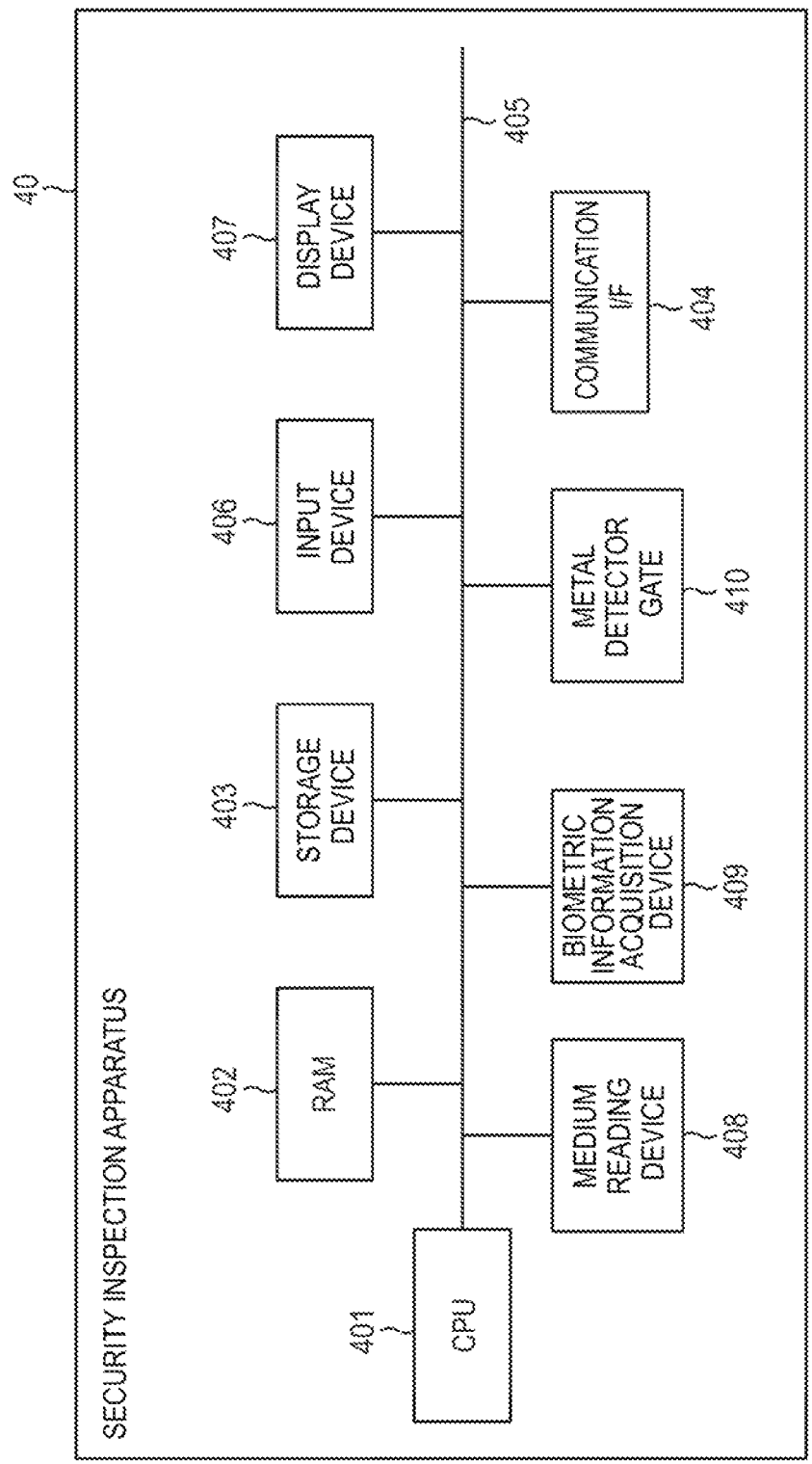
FIG. 10 is a block diagram illustrating one example of a hardware configuration of a security inspection apparatus in the first example embodiment.

FIG. 10 is a block diagram illustrating one example of a hardware configuration of the security inspection apparatus 40. As illustrated in FIG. 10, the security inspection apparatus 40 has a CPU 401, a RAM 402, a storage device 403, a communication I/F 404, an input device 406, a display device 407, a medium reading device 408, a biometric information acquisition device 409, and a metal detector gate 410. Each device is connected to a bus line 405.

The metal detector gate 410 is a gate type metal detector and detects a metal worn by the user U passing through the metal detector gate 410.

Figure 11:
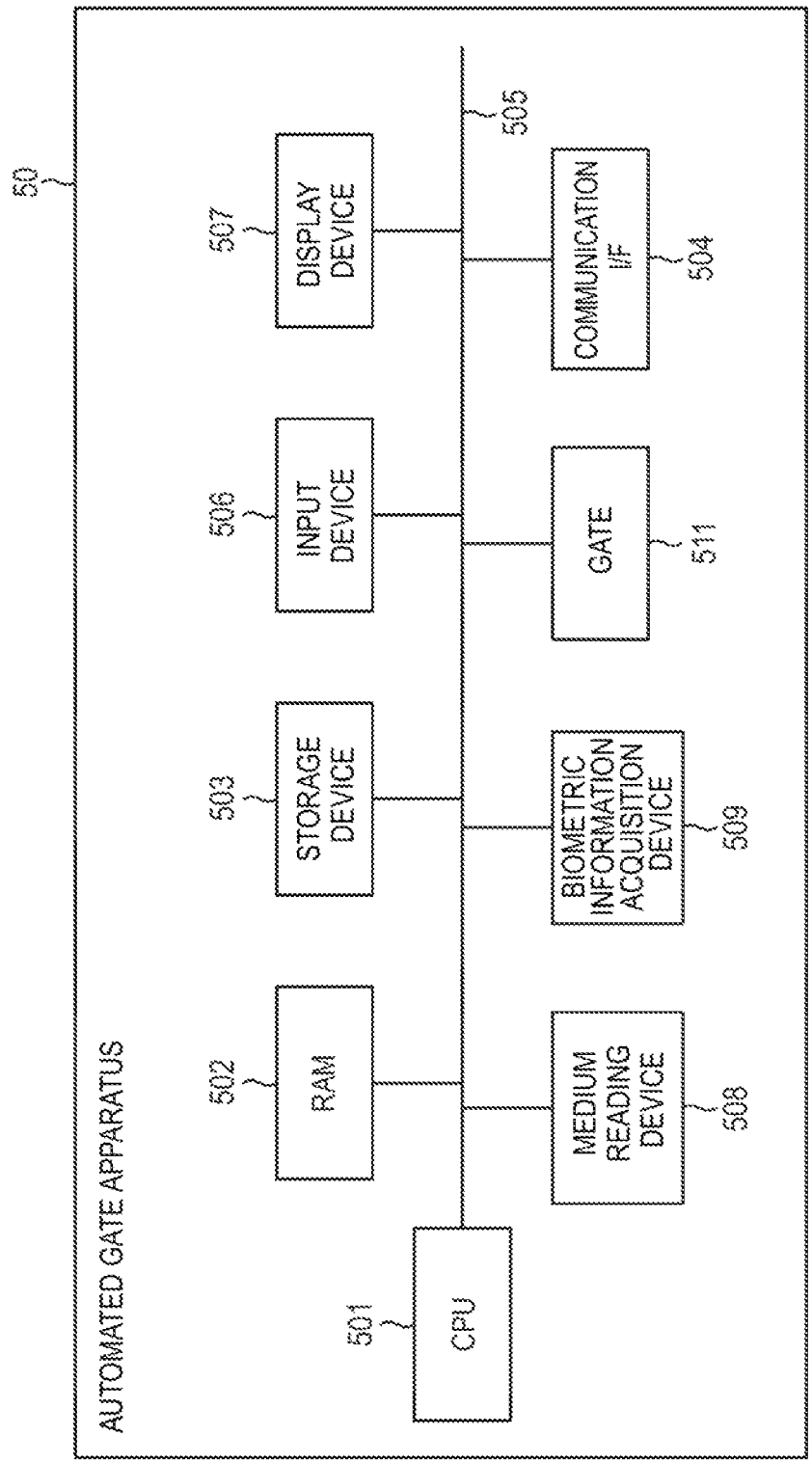
FIG. 11 is a block diagram illustrating one example of a hardware configuration of an automated gate apparatus in the first example embodiment.

FIG. 11 is a block diagram illustrating one example of a hardware configuration of the automated gate apparatus 50. The automated gate apparatus 50 has a CPU 501, a RAM 502, a storage device 503, a communication I/F 504, an input device 506, a display device 507, a medium reading device 508, a biometric information acquisition device 509, and a gate 511. Each device is connected to a bus line 505. Note that the automated gate apparatus 50 is arranged in the entry inspection site has the same hardware as the automated gate apparatus 50 arranged in the immigration site.

The gate 511 transitions from a closed state to block passage of the user U during standby to an opened state to permit passage of the user U under the control of the CPU 501 when identity verification of the user U at the automated gate apparatus 50 is successful and the user U passes through immigration. The scheme of the gate 511 is not particularly limited and may be, for example, a flapper gate whose flapper provided on one side of the pathway or flappers provided on both sides of the pathway are opened and closed, a turn style gate whose three bars rotate, or the like.

Figure 12:
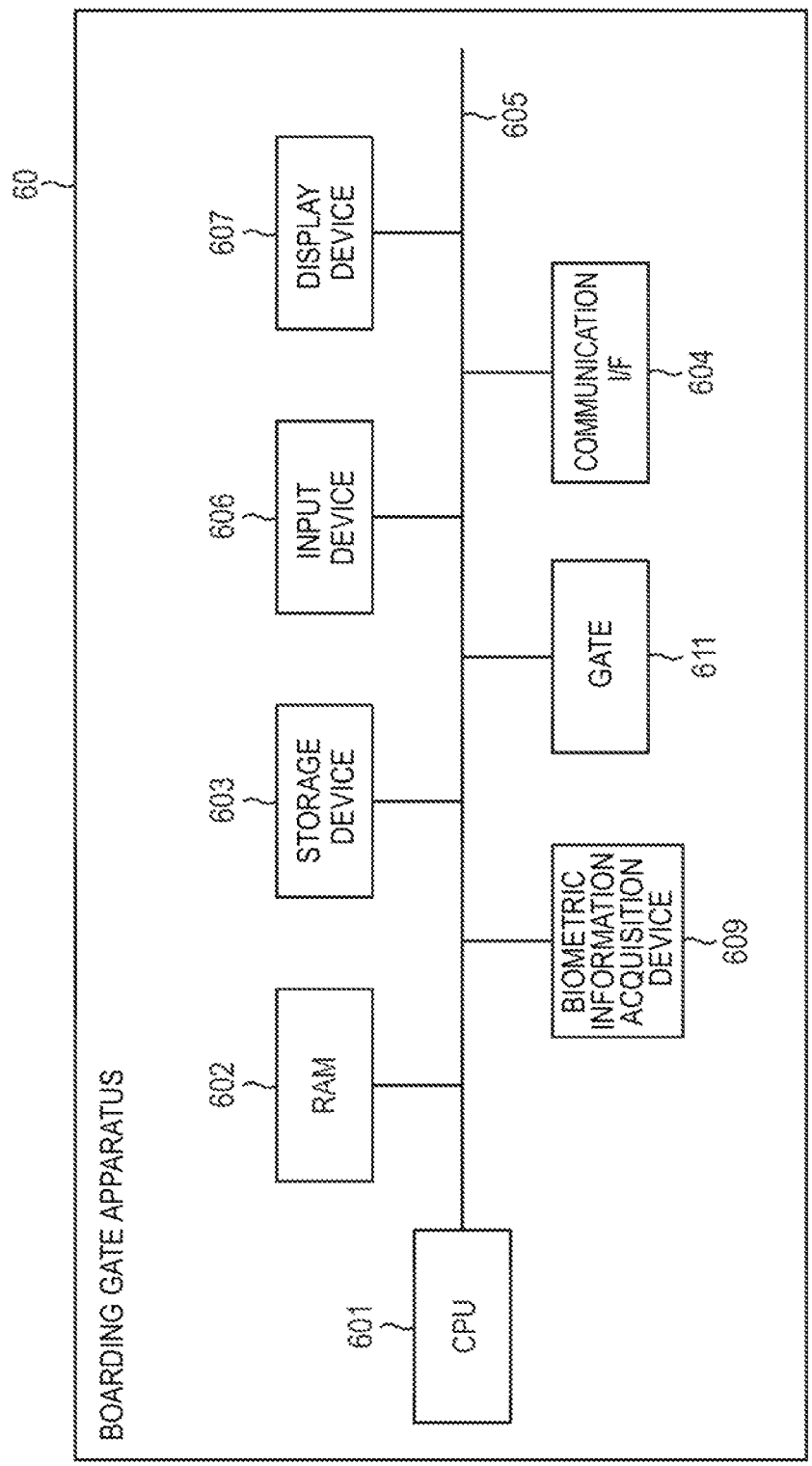
FIG. 12 is a block diagram illustrating one example of a hardware configuration of a boarding gate apparatus in the first example embodiment.

FIG. 12 is a block diagram illustrating one example of a hardware configuration of the boarding gate apparatus 60. As illustrated in FIG. 12, the boarding gate apparatus 60 has a CPU 601, a RAM 602, a storage device 603, a communication I/F 604, an input device 606, a display device 607, a biometric information acquisition device 609, and a gate 611. Each device is connected to a bus line 605.

Figure 13:
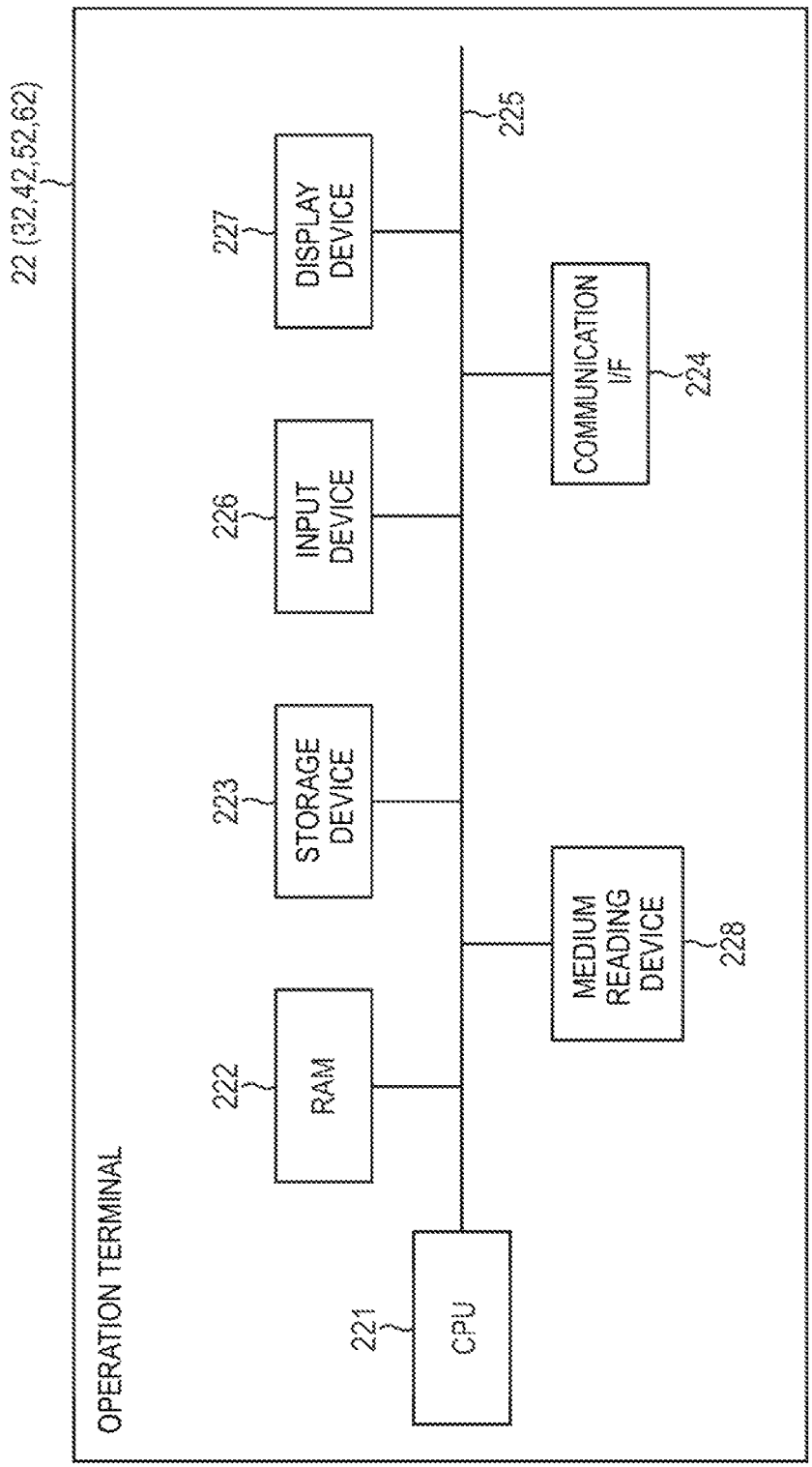
FIG. 13 is a block diagram illustrating one example of a hardware configuration of an operation terminal in the first example embodiment.

FIG. 13 is a block diagram illustrating one example of a hardware configuration of each of the operation terminals 22, 32, 42, 52, and 62. As illustrated in FIG. 13, the operation terminal 22 has a CPU 221, a RAM 222, a storage device 223, a communication I/F 224, an input device 226, a display device 227, and a medium reading device 228. Each device is connected to a bus line 225. Note that each hardware configuration of the operation terminals 32, 42, 52, and 62 is the same as that of the operation terminal 22.

Next, the operation of each apparatus in the information processing system 1 in the present example embodiment will be described based on FIG. 14 to FIG. 26.

[Check-In Procedure]

Figure 14:
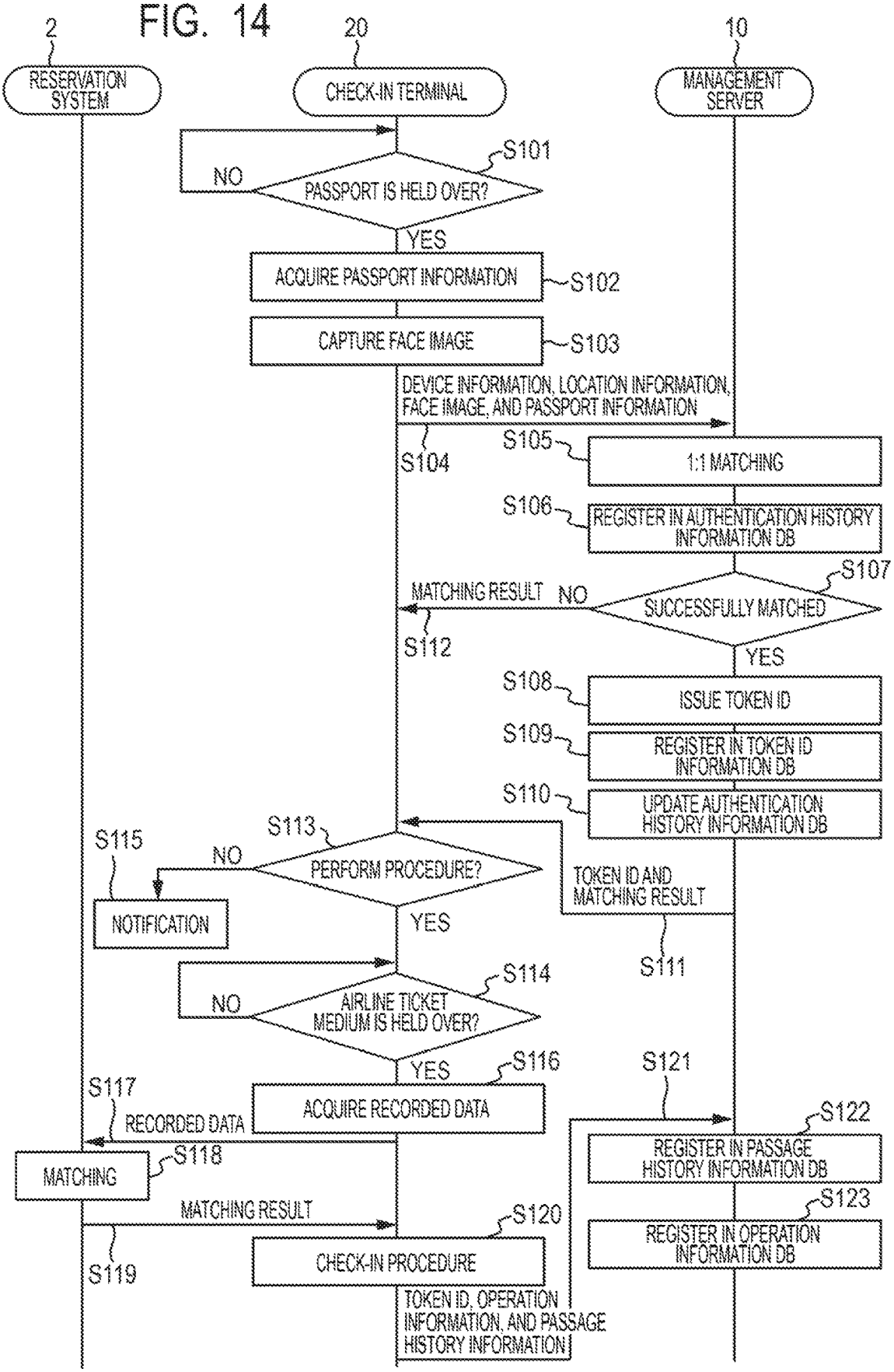
FIG. 14 is a sequence diagram illustrating one example of the process in a reservation system, the check-in terminal, and the management server in the first example embodiment.

FIG. 14 is a sequence diagram illustrating one example of the process in the reservation system 2, the check-in terminal 20, and the management server 10. This process is performed every time the user U uses the check-in terminal 20 to perform a check-in procedure.

First, the check-in terminal 20 determines whether or not a passport of the user U is held over a reading unit (not illustrated) of the medium reading device 208 (step S101) and stands by until a passport is held over (step S101, NO).

Next, if it is determined that a passport is held over the reading unit of the medium reading device 208 (step S101, YES), the check-in terminal 20 acquires passport information on the user U from the passport that is held over (step S102). The acquired passport information includes a passport face image of the user U, identity verification information, a passport number, information on a passport issuance country, or the like.

Next, the check-in terminal 20 captures a face of the user U by using the biometric information acquisition device 209 (step S103) and transmits the face image, the passport information, and the device information and the location information of the check-in terminal 20 to the management server 10 (step S104). Note that it is preferable to display a window used for obtaining consent of the user U before capturing a face image.

In response to receiving information from the check-in terminal 20, the management server 10 matches, at 1:1, a face image recorded on the passport of the user U (hereafter, referred to as "passport face image") with a face image captured by the check-in terminal 20 (hereafter, referred to as "target face image") (step S105).

Next, the management server 10 issues an authentication history ID and registers, in the authentication history information DB 13, authentication history information in which an authentication history ID, an authentication score, an authentication processing time, and an authentication result are associated (step S106).

Next, if it is determined that the matching result between the passport face image and the target face image indicates a successful matching (step S107, YES), the management server 10 issues a token ID (step S108). The token ID is set to a unique value based on date and time or a sequence number at a process, for example.

Next, the management server 10 uses the target face image as a registered face image and registers the relationship between the token ID and the registered face image in the token ID information DB 11 (step S109). Further, the management server 10 updates the authentication history information DB 13 in order to add the token ID to the authentication history of the matched user U (step S110).

In the present example embodiment, the reason why a face image captured on site (target face image) is used as the registered face image is that the lifecycle of a token ID is terminated within the day, that a captured image is closer to an image captured in the subsequent authentication process than a passport face image in a quality (appearance), or the like. However, a passport face image may be set as a registered face image (registered biometric information) instead of a target face image (captured face image). For example, when a lifecycle of a token ID spans a long term (for example, when a token ID is validated for a certain lifecycle if the user U has a membership, or the like in airline services), a face image of a passport or a license card may be set as a registered face image.

Next, the management server 10 transmits the issued token ID and the matching result of a successful matching to the check-in terminal 20 (step S111).

On the other hand, if it is determined that the matching result between the passport face image and the target face image indicates an unsuccessful matching (step S107, NO), the management server 10 transmits the matching result of the unsuccessful matching to the check-in terminal 20 (step S112).

Next, based on the matching result of the successful matching received from the management server 10, if the check-in terminal 20 determines that the check-in procedure can be performed (step S113, YES), the process proceeds to step S114. Contrarily, based on the matching result of the unsuccessful matching received from the management server 10, if the check-in terminal 20 determines that the check-in procedure is not performed (step S113, NO), the check-in terminal 20 notifies the user U of an error message (step S115).

In step S114, the check-in terminal 20 determines whether or not an airline ticket medium of the user U is held over the reading unit of the medium reading device 208. The check-in terminal 20 stands by until an airline ticket medium is held over (step S114, NO).

Next, if it is determined that an airline ticket medium is held over the reading unit of the medium reading device 208 (step S114, YES), the check-in terminal 20 acquires recorded data such as a reservation number, an airline code, and the like from the airline ticket medium that is held over (step S116).

Next, the check-in terminal 20 transmits the recorded data to the reservation system 2 of an airline company corresponding to the airline code (step S117) and requests matching between the recorded data and boarding reservation information.

In response to receiving recorded data from the check-in terminal 20, the reservation system 2 matches the recorded data with boarding reservation information stored in the reservation information DB 3 (step S118) and transmits the matching result to the check-in terminal 20 (step S119).

Next, in response to receiving the matching result of a successful matching from the reservation system 2, the check-in terminal 20 performs a check-in procedure such as confirmation of an itinerary, selection of a seat, or the like based on the input information on the user U (step S120). If there is no matching in the matching result in the reservation system 2, the check-in terminal 20 may notify the user U of an error without performing a check-in procedure. The check-in terminal 20 then transmits, to the management server 10, a token ID, operation information, and passage history information indicating completion of procedure at the check-in terminal 20 (step S121). Further, the passage history information includes information such as the passage time at the touch point P1, the device name of a terminal used for the procedure, or the like.

Next, in response to receiving the information from the check-in terminal 20, the management server 10 registers passage history information indicating a relationship between the token ID and the passage information at the touch point P1 in the passage history information DB 12 (step S122). The management server 10 then registers the operation information including the boarding reservation information received from the check-in terminal 20 in the operation information DB 14 (step S123).

As described above, a target face image (captured face image) successfully matched with a passport face image acquired from a passport in a check-in procedure is registered in the token ID information DB 11 as a registered face image, and a registered face image and operation information in the operation information DB 14 are associated with each other by the issued token ID. This enables biometric authentication by using face matching between a captured face image and a registered face image at each subsequent touch point.

[Baggage Drop-Off Procedure]

Figure 15:
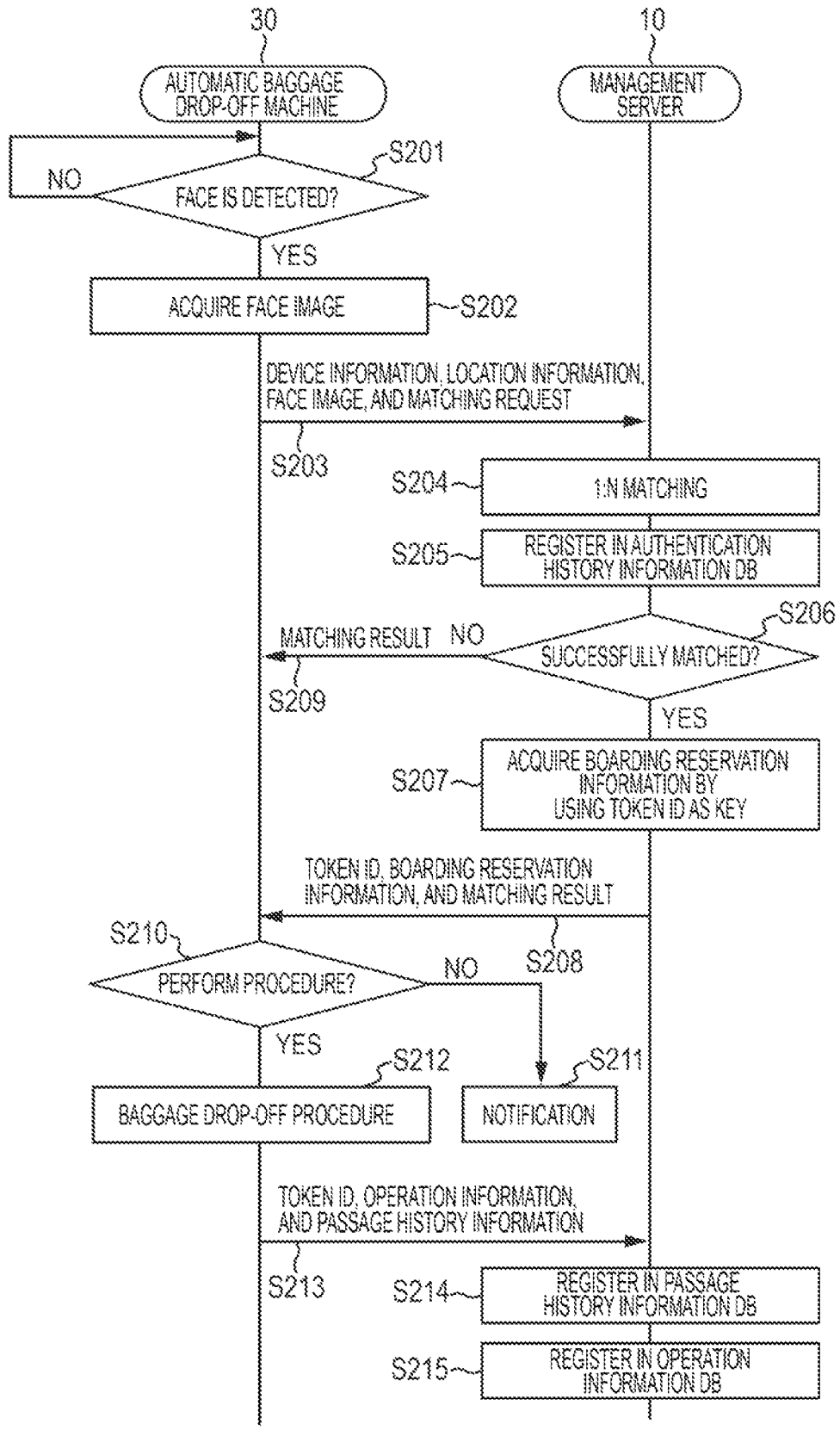
FIG. 15 is a sequence diagram illustrating one example of the process in the automatic baggage drop-off machine and the management server in the first example embodiment.

FIG. 15 is a sequence diagram illustrating one example of the process in the automatic baggage drop-off machine 30 and the management server 10. This process is performed when the user U who completed the check-in procedure makes a baggage drop-off procedure if necessary.

The automatic baggage drop-off machine 30 continuously or periodically captures the area in front of the apparatus and determines whether or not a face of the user U standing in front of the automatic baggage drop-off machine 30 is detected in the captured image (step S201). The automatic baggage drop-off machine 30 stands by until a face of the user U is detected in an image by the biometric information acquisition device 309 (step S201, NO).

If it is determined that a face of the user U is detected by the biometric information acquisition device 309 (step S201, YES), the automatic baggage drop-off machine 30 captures the face of the user U and acquires the face image of the user U as a target face image (step S202).

Next, the automatic baggage drop-off machine 30 transmits the target face image of the user U captured by the biometric information acquisition device 309 and the device information and the location information of the automatic baggage drop-off machine 30 to the management server 10 together with a matching request (step S203). Thereby, the automatic baggage drop-off machine 30 requests the management server 10 to match, at 1:N, the target face image of the user U captured by the biometric information acquisition device 309 with a plurality of registered face images registered in the token ID information DB 11 of the management server 10.

In response to receiving the information such as the target face image and the matching request from the automatic baggage drop-off machine 30, the management server 10 performs matching of the face image of the user U (step S204). That is, the management server 10 matches, at 1:N, the target face image received from the automatic baggage drop-off machine 30 with a plurality of registered face images registered in the token ID information DB 11. Note that the registered face images to be matched are limited to images associated with the token ID whose invalid flag has a value of "1" (valid).

Next, the management server 10 issues an authentication history ID and registers, in the authentication history information DB 13, authentication history information in which the authentication history ID, the device information, the location information, the authentication score, the authentication processing time, and the authentication result are associated (step S205). Note that, if the matching result in step S204 indicates a successful matching, since the token ID associated with the successfully matched registered face image can be identified, the token ID is included in the authentication history information.

Herein, if the management server 10 determines that the matching result indicates an unsuccessful matching (step S206, NO), the management server 10 transmits the unsuccessful matching result to the automatic baggage drop-off machine 30 (step S209), and the process proceeds to step S210. Contrarily, if the management server 10 determines that the matching result indicates a successful matching (step S206, YES), the process proceeds to step S207.

In step S207, the management server 10 acquires boarding reservation information such as a reservation number or the like from the operation information DB 14 by using, as a key, the token ID associated with the successfully matched registered face image in the token ID information DB 11. The management server 10 then transmits the token ID, the boarding reservation information, and the matching result to the automatic baggage drop-off machine 30 (step S208).

Next, if the automatic baggage drop-off machine 30 determines based on the matching result that the procedure can be performed (step S210, YES), the process proceeds to step S212.

Contrarily, if it is determined based on the matching result that the procedure is not performed (step S210, NO), the automatic baggage drop-off machine 30 notifies the user U of an error message (step S211).

In step S212, the automatic baggage drop-off machine 30 performs the process of a baggage drop-off procedure of the user U based on the boarding reservation information received from the management server 10.

Next, the automatic baggage drop-off machine 30 transmits, to the management server 10, the token ID, the operation information, and passage history information indicating that the baggage drop-off procedure of the user U completed after the matching of the face image (step S213). Note that the passage history information includes information such as the passage time at the touch point P2, the device name of the used terminal, or the like.

In response to receiving the information from the automatic baggage drop-off machine 30, the management server 10 registers, in the passage history information DB 12, passage history information indicating the relationship between the token ID and the passage information at the touch point P2 on the user U (step S214). The management server 10 then registers the operation information received from the automatic baggage drop-off machine 30 in the operation information DB 14 if necessary (step S215).

[Security Inspection Procedure]

Figure 16:
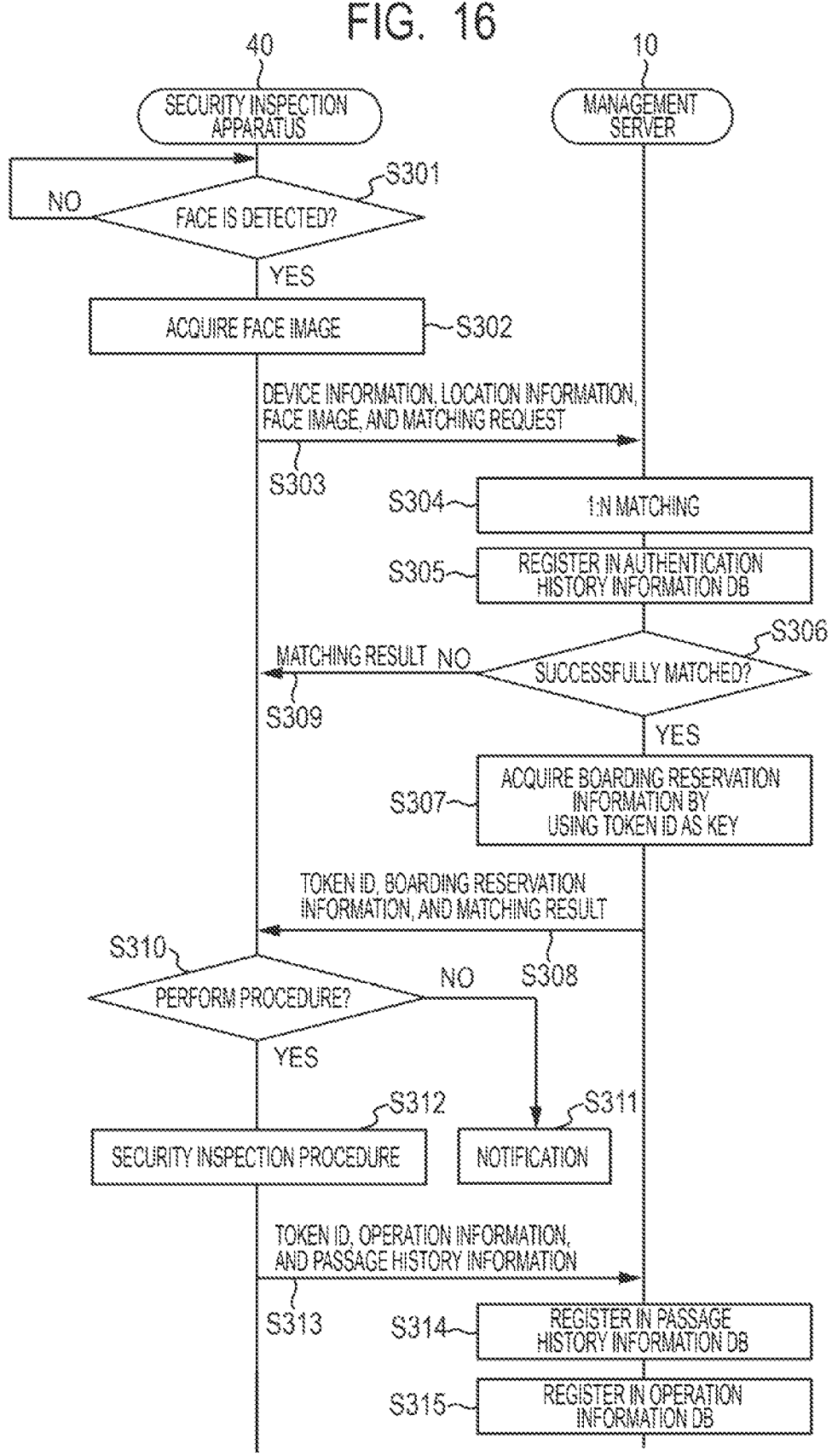
FIG. 16 is a sequence diagram illustrating one example of the process in the security inspection apparatus and the management server in the first example embodiment.

FIG. 16 is a sequence diagram illustrating one example of the process in the security inspection apparatus 40 and the management server 10. This process is performed when the user U who completed a check-in procedure or a baggage drop-off procedure goes through a security inspection procedure.

The security inspection apparatus 40 continuously or periodically captures the front area of the metal detector gate 410 and determines whether or not a face of the user U standing in front of the metal detector gate 410 is detected in a captured image (step S301). The security inspection apparatus 40 stands by until a face of the user U is detected in an image by the biometric information acquisition device 409 (step S301, NO).

If it is determined that a face of the user U is detected by the biometric information acquisition device 409 (step S301, YES), the security inspection apparatus 40 captures the face of the user U and acquires the face image of the user U as a target face image (step S302).

Next, the security inspection apparatus 40 transmits the target face image of the user U captured by the biometric information acquisition device 409 and the device information and the location information of the security inspection apparatus 40 to the management server 10 together with a matching request (step S303). Thereby, the security inspection apparatus 40 requests the management server 10 to match, at 1:N, the target face image of the user U captured by the biometric information acquisition device 409 with a plurality of registered face images registered in the token ID information DB 11 of the management server 10.

In response to receiving the target face image, the matching request, and the like from the security inspection apparatus 40, the management server 10 performs matching of the face image of the user U (step S304). That is, the management server 10 matches, at 1:N, the target face image received from the security inspection apparatus 40 with a plurality of registered face images registered in the token ID information DB 11. Note that the registered face images to be matched are limited to images associated with the token ID whose invalid flag has a value of "1" (valid).

Next, the management server 10 issues an authentication history ID and registers, in the authentication history information DB 13, authentication history information in which the authentication history ID, the device information, the location information, the authentication score, the authentication processing time, and the authentication result are associated (step S305). Note that, if the matching result in step S304 indicates a successful matching, since the token ID associated with the successfully matched registered face image can be identified, the authentication history information includes the token ID.

Herein, if the management server 10 determines that the matching result indicates an unsuccessful matching (step S306, NO), the management server 10 transmits the matching result of the unsuccessful matching to the security inspection apparatus 40 (step S309), and the process proceeds to step S310. Contrarily, if the management server 10 determines that the matching result indicates a successful matching (step S306, YES), the process proceeds to step S307.

In step S307, the management server 10 acquires boarding reservation information such as a reservation number from the operation information DB 14 by using, as a key, the token ID associated with the successfully matched registered face image in the token ID information DB 11. The management server 10 then transmits the token ID, the boarding reservation information, and the matching result to the security inspection apparatus 40 (step S308). The process proceeds to step S310.

Next, if the security inspection apparatus 40 determines based on the matching result that the procedure can be performed (step S310, YES), the process proceeds to step S312.

Contrarily, if it is determined based on the matching result that the procedure is not performed (step S310, NO), the security inspection apparatus 40 notifies the user U of an error message (step S311).

Next, the security inspection apparatus 40 performs the security inspection process on the user U based on the boarding reservation information received from the management server 10 (step S312). In the security inspection process, the CPU 401 controls each component of the security inspection apparatus 40. Thereby, the security inspection apparatus 40 detects a metal worn by the user U passing through the metal detector gate 410. The user U who has passed through the metal detector gate 410 moves to an immigration site.

Next, the security inspection apparatus 40 transmits, to the management server 10, the token ID, the operation information, and passage history information indicating that the security inspection procedure of the user U completed after the matching of the face image (step S313). Note that the passage history information includes information such as the passage time at the touch point P3, the device name of the used terminal, or the like.

In response to receiving the information from the security inspection apparatus 40, the management server 10 registers, in the passage history information DB 12, passage history information indicating the relationship between the token ID and the passage information at the touch point P3 on the user U (step S314). The management server 10 then registers the operation information received from the security inspection apparatus 40 in the operation information DB 14 if necessary (step S315).

[Immigration Procedure]

Figure 17:
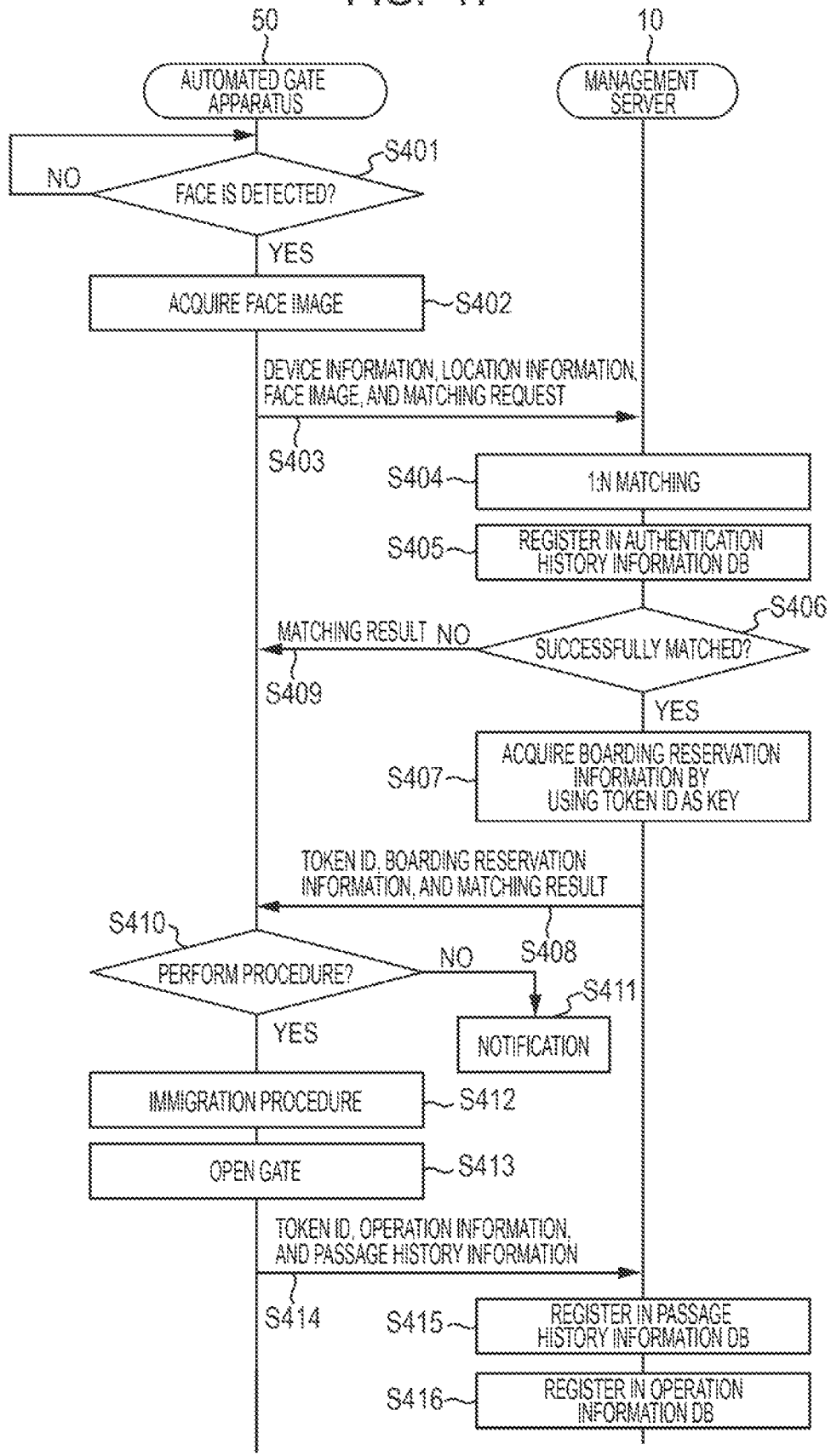
FIG. 17 is a sequence diagram illustrating one example of the process in the automated gate apparatus and the management server in the first example embodiment.

FIG. 17 is a sequence diagram illustrating one example of the process in the automated gate apparatus 50 and the management server 10.

The user U who completed the security inspection procedure moves to the immigration site and goes through an immigration procedure at the automated gate apparatus 50. The automated gate apparatus 50 and the management server 10 perform the process illustrated in FIG. 17 every time each of a plurality of users U is subjected to the immigration procedure.

The automated gate apparatus 50 continuously or periodically captures the front area of the automated gate apparatus 50 and determines whether or not a face of the user U standing in front of the automated gate apparatus 50 is detected in a captured image (step S401). The automated gate apparatus 50 stands by until a face of the user U is detected in an image by the biometric information acquisition device 509 (step S401, NO).

If it is determined that a face of the user U is detected by the biometric information acquisition device 509 (step S401, YES), the automated gate apparatus 50 captures the face of the user U and acquires the face image of the user U as a target face image (step S402).

Next, the automated gate apparatus 50 transmits the target face image of the user U captured by the biometric information acquisition device 509 and the device information and the location information of the automated gate apparatus 50 to the management server 10 together with a matching request (step S403). Thereby, the automated gate apparatus 50 requests the management server 10 to match, at 1:N, the target face image of the user U captured by the biometric information acquisition device 509 with a plurality of registered face images registered in the token ID information DB 11 of the management server 10.

In response to receiving the target face image, the matching request, and the like from the automated gate apparatus 50, the management server 10 performs matching of the face image of the user U (step S404). That is, the management server 10 matches, at 1:N, the target face image received from the automated gate apparatus 50 with a plurality of registered face images registered in the token ID information DB 11. Note that the registered face images to be matched are limited to images associated with the token ID whose invalid flag has a value of "1" (valid).

Next, the management server 10 issues an authentication history ID and registers, in the authentication history information DB 13, authentication history information in which the authentication history ID, the device information, the location information, the authentication score, the authentication processing time, and the authentication result are associated (step S405). Note that, if the matching result in step S404 indicates a successful matching, since the token ID associated with the successfully matched registered face image can be identified, the authentication history information also includes the token ID.

If the management server 10 determines that the matching result indicates an unsuccessful matching (step S406, NO), the management server 10 transmits the matching result indicating an unsuccessful matching to the automated gate apparatus 50 (step S409), and the process proceeds to step S410. Contrarily, if the management server 10 determines that the matching result indicates a successful matching (step S406, YES), the process proceeds to step S407.

In step S407, the management server 10 acquires boarding reservation information such as a reservation number from the operation information DB 14 by using, as a key, the token ID associated with the successfully matched registered face image in the token ID information DB 11. The management server 10 then transmits the token ID, the boarding reservation information, and the matching result to the automated gate apparatus 50 (step S408). The process proceeds to step S410.

Next, if the automated gate apparatus 50 determines based on the matching result that the procedure can be performed (step S410, YES), the process proceeds to step S412. Contrarily, if the automated gate apparatus 50 determines based on the matching result that the procedure is not performed (step S410, NO), the automated gate apparatus 50 notifies the user U of an error message (step S411). For example, a notification window including a message such as "Please move to immigration procedure at the manned counter" is displayed on the display device 507.

Next, the automated gate apparatus 50 performs an immigration procedure of the user U based on the boarding reservation information received from the management server 10 (step S412) and opens the gate 511 (step S413). The user U who has passed through the touch point P4 moves to a departure area in which a boarding gate is provided.

Next, the automated gate apparatus 50 transmits, to the management server 10, the token ID, the operation information, and passage history information indicating that the immigration procedure of the user U completed after the matching of the face image (step S414). Note that the passage history information includes information such as the passage time at the touch point P4, the device name of the used terminal, or the like.

In response to receiving the information from the automated gate apparatus 50, the management server 10 registers, in the passage history information DB 12, passage history information indicating the relationship between the token ID and the passage information at the touch point P4 on the user U (step S415). The management server 10 then registers the operation information received from the automated gate apparatus 50 in the operation information DB 14 if necessary (step S416).

[Boarding Check at Boarding Gate]

Figure 18:
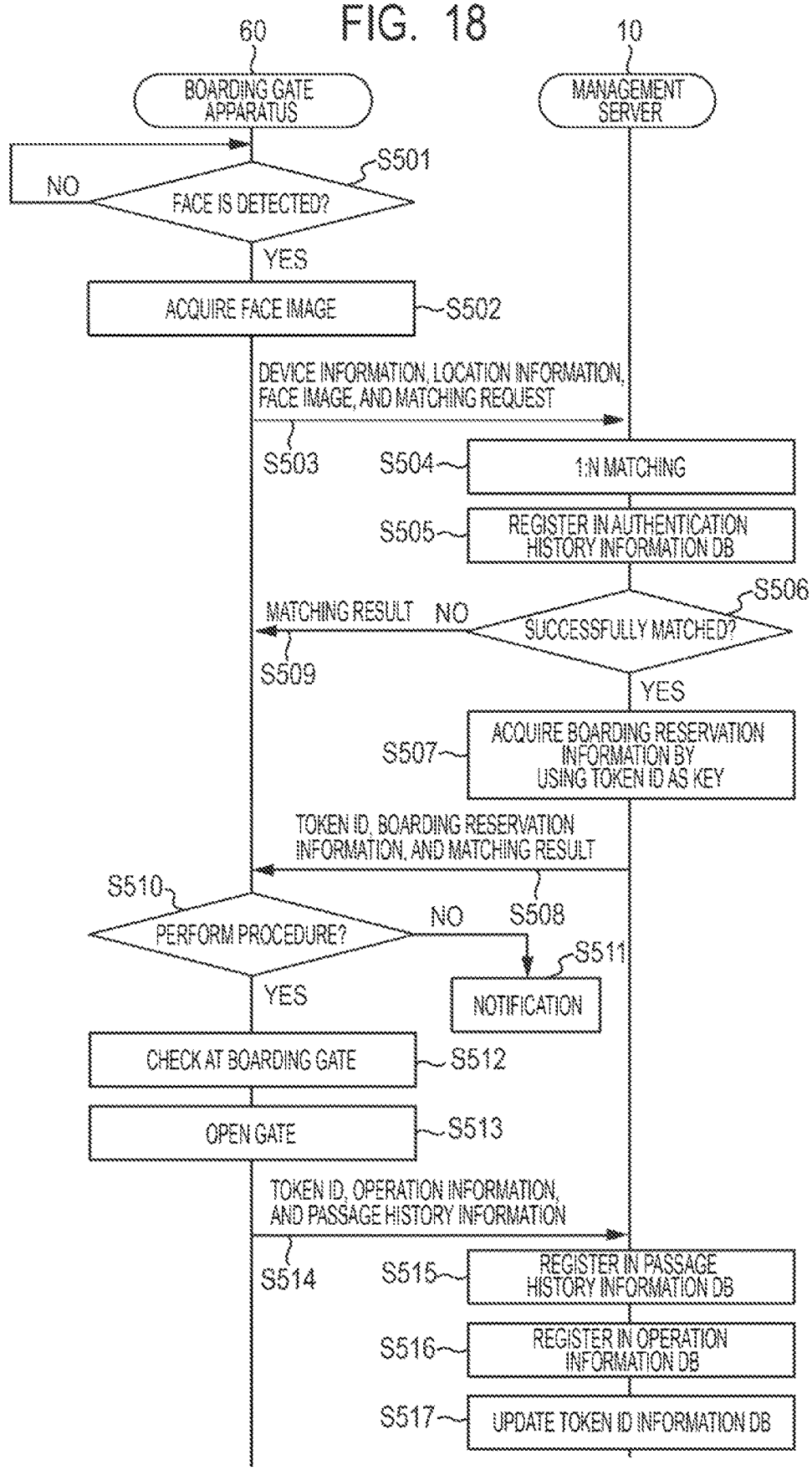
FIG. 18 is a sequence diagram illustrating one example of the process in the boarding gate apparatus and the management server in the first example embodiment.

FIG. 18 is a sequence diagram illustrating one example of the process in the boarding gate apparatus 60 and the management server 10. This process is performed when the user U passes through a boarding gate.

The boarding gate apparatus 60 continuously or periodically captures the front area of the apparatus and determines whether or not a face of the user U standing in front of the boarding gate apparatus 60 is detected in a captured image (step S501). The boarding gate apparatus 60 stands by until a face of the user U is detected in an image by the biometric information acquisition device 609 (step S501, NO).

If it is determined that a face of the user U is detected by the biometric information acquisition device 609 (step S501, YES), the boarding gate apparatus 60 captures the face of the user U and acquires the face image of the user U as a target face image (step S502).

Next, the boarding gate apparatus 60 transmits the target face image of the user U captured by the biometric information acquisition device 609 and the device information and the location information of the boarding gate apparatus 60 to the management server 10 together with a matching request (step S503). Thereby, the boarding gate apparatus 60 requests the management server 10 to match, at 1:N, the target face image of the user U captured by the biometric information acquisition device 609 with a plurality of registered face images registered in the token ID information DB 11 of the management server 10.

In response to receiving the target face image, the matching request, and the like from the boarding gate apparatus 60, the management server 10 performs matching of the face image of the user U (step S504). That is, the management server 10 matches, at 1:N, the target face image received from the boarding gate apparatus 60 with a plurality of registered face images registered in the token ID information DB 11. Note that the registered face images to be matched are limited to images associated with the token ID whose invalid flag has a value of "1" (valid).

Next, the management server 10 issues an authentication history ID and registers, in the authentication history information DB 13, authentication history information in which the authentication history ID, the device information, the location information, the authentication score, the authentication processing time, and the authentication result are associated (step S505). Note that, if the matching result in step S504 indicates a successful matching, since the token ID associated with the successfully matched registered face image can be identified, the authentication history information includes the token ID.

If the management server 10 determines that the matching result indicates an unsuccessful matching (step S506, NO), the management server 10 transmits the matching result indicating an unsuccessful matching to the boarding gate apparatus 60 (step S509), and the process proceeds to step S510. Contrarily, if the management server 10 determines that the matching result indicates a successful matching (step S506, YES), the process proceeds to step S507.

In step S507, the management server 10 acquires boarding reservation information such as a reservation number from the operation information DB 14 by using, as a key, the token ID associated with the successfully matched registered face image in the token ID information DB 11. The management server 10 then transmits the token ID, the boarding reservation information, and the matching result to the boarding gate apparatus 60 (step S508). The process proceeds to step S510.

Next, if the boarding gate apparatus 60 determines based on the matching result that the procedure can be performed (step S510, YES), the process proceeds to step S512.

Contrarily, if the boarding gate apparatus 60 determines based on the matching result that the procedure is not performed (step S510, NO), the boarding gate apparatus 60 notifies the user U of an error message (step S511). For example, the boarding gate apparatus 60 displays a notification window including a message such as "Please move to procedure at the manned counter" on the display device 607.

In step S512, in response to receiving the boarding reservation information from the reservation system 2, the boarding gate apparatus 60 performs check for boarding of the user U based on the flight number, the gate number, the boarding start time, and the like included in the boarding reservation information. When permitting the boarding, the boarding gate apparatus 60 opens the gate 611 (step S513). The user U who has passed through the touch point P5 boards an airplane. Note that, if the boarding gate apparatus 60 determines not to permit boarding in step S512, it is preferable to notify the user U of an error message without opening the gate 611. For example, the gate 611 is not opened when the user U makes a mistake in the number of the gate 611, when the current time is before the time to the boarding start time, or the like.

Next, the boarding gate apparatus 60 transmits, to the management server 10, the token ID, the operation information, and passage history information indicating that the user U completed the boarding on the airplane after the matching of the face image (step S514). Note that the passage history information includes information such as the passage time at the touch point P5, the device name of the used terminal, or the like.

In response to receiving the information from the boarding gate apparatus 60, the management server 10 registers, in the passage history information DB 12, passage history information indicating the relationship between the token ID and the passage information at the touch point P5 on the user U (step S515). The management server 10 then registers the operation information received from the boarding gate apparatus 60 in the operation information DB 14 if necessary (step S516).

The management server 10 then updates the token ID information DB 11 (step S517). Specifically, the management server 10 updates the invalid flag in the token ID information DB 11 to a value of invalidity ("0"). Thereby, the lifecycle of the token ID expires.

[Procedure by Method Other Than Biometric Authentication]

Figure 19:
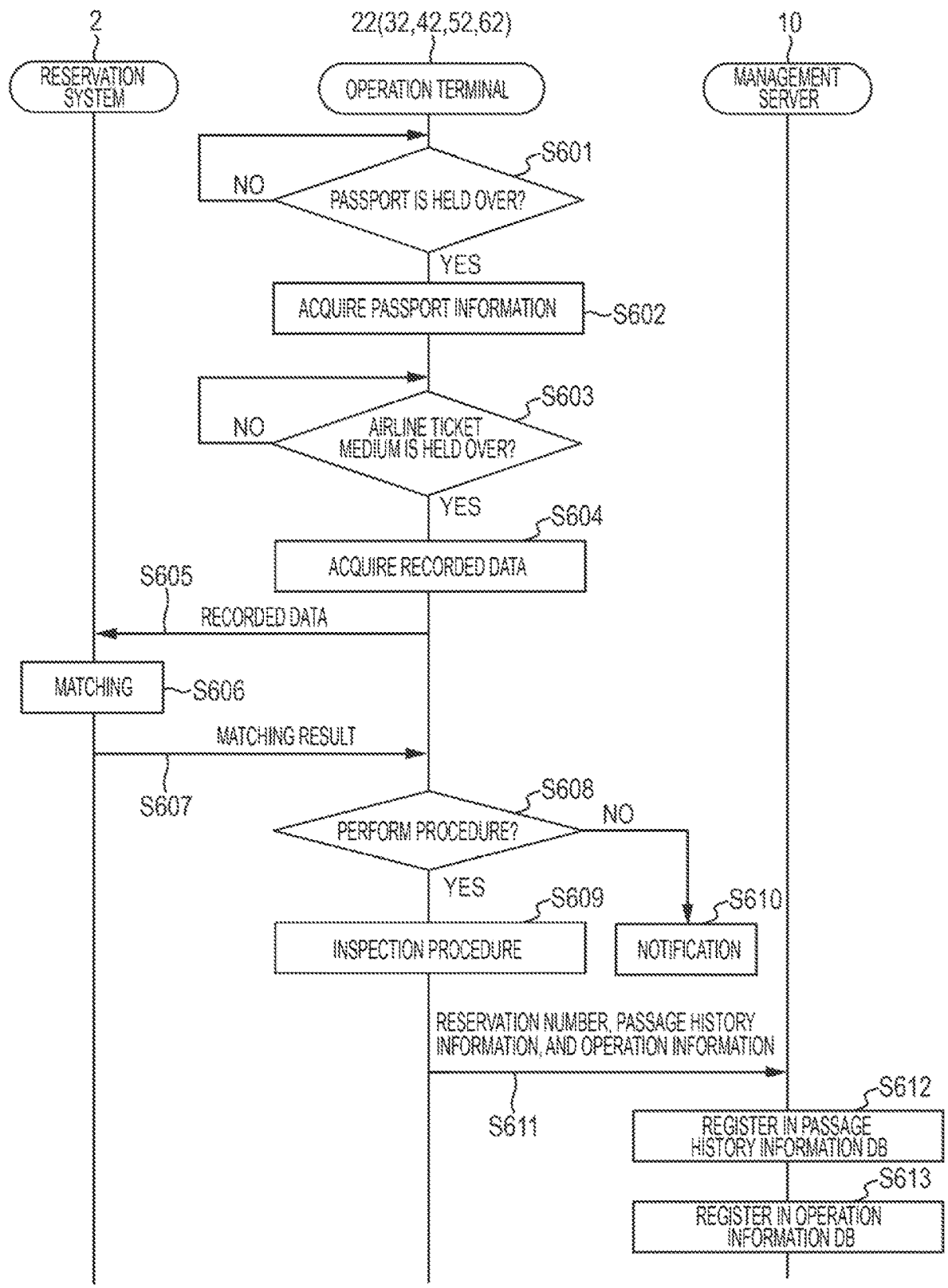
FIG. 19 is a sequence diagram illustrating one example of the process in the reservation system, the operation terminal, and the management server in the first example embodiment.

FIG. 19 is a sequence diagram illustrating one example of the process in the reservation system 2, the operation terminal 22, and the management server 10. This process is performed when each of the staff members (S1 to S5) uses the operation terminal 22 or the like to perform a procedure. Herein, the operation terminal 22 arranged at the touch point P1 will be described as an example.

First, the operation terminal 22 determines whether or not a passport of the user U is held over a reading unit (not illustrated) of the medium reading device 228 (step S601) and stands by until a passport is held over (step S601, NO).

Next, if it is determined that a passport is held over the reading unit of the medium reading device 228 (step S601, YES), the operation terminal 22 acquires passport information on the user U from the passport that is held over (step S602). The acquired passport information includes a passport face image of the user U, identity verification information, a passport number, information on a passport issuance country, or the like.

Next, the operation terminal 22 determines whether or not an airline ticket medium of the user U is held over a reading unit of the medium reading device 228 (step S603). The operation terminal 22 stands by until an airline ticket medium is held over (step S603, NO).

Next, if it is determined that an airline ticket medium is held over the reading unit of the medium reading device 228 (step S603, YES), the operation terminal 22 acquires recorded data such as a reservation number and an airline code from the airline ticket medium that is held over (step S604).

Next, the operation terminal 22 transmits the recorded data to the reservation system 2 of an airline company corresponding to the airline code (step S605) and requests matching of the recorded data with the boarding reservation information.

In response to receiving the recorded data from the operation terminal 22, the reservation system 2 matches the recorded data with the boarding reservation information recorded in the reservation information DB3 (step S606) and transmits the matching result to the operation terminal 22 (step S607).

Next, in response to receiving the matching result from the reservation system 2, the operation terminal 22 determines whether or not the procedure at the touch point P1 can be performed (step S608). Herein, if the operation terminal 22 determines that the procedure can be performed (step S608, YES), the process proceeds to step S609. Contrarily, based on the information received from the management server 10, if the operation terminal 22 determines that the procedure is not performed (step S608, NO), the operation terminal 22 provides a notification of an error message (step S610).

In step S609, the operation terminal 22 performs an inspection procedure (check-in procedure) at the touch point P1 based on information input by the staff member S. The operation terminal 22 transmits, to the management server 10, the reservation number, the operation information obtained by the process at the operation terminal 22, and the passage history information indicating completion of the procedure at the operation terminal 22 (step S611).

Next, in response to receiving the information from the operation terminal 22, the management server 10 registers the passage history information in the passage history information DB 12 (step S612). The management server 10 then registers the operation information received from the operation terminal 22 in the operation information DB 14 if necessary (step S613).

[Statistics Analysis Process]

Figure 20:
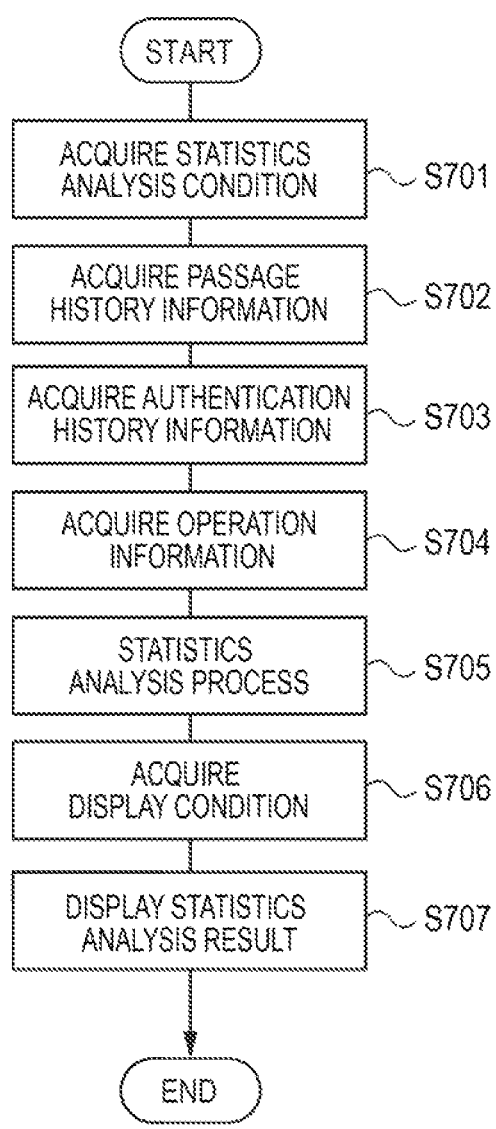
FIG. 20 is a flowchart illustrating one example of the process in the management server in the first example embodiment.

FIG. 20 is a flowchart illustrating one example of the process in the management server 10. This process is performed in a predetermined cycle or when a process request is input by a manager of the system or the like.

First, in response to acquiring a statistics analysis condition set by the manager or the like (step S701), the management server 10 acquires passage history information of a specified period based on the statistics analysis condition from the passage history information DB 12 (step S702). Note that, when a procedure is performed with reading of a recording medium at each of the touch points P1 to P5, passage history information including no token ID is acquired from the passage history information DB 12.

Next, the management server 10 acquires authentication history information at the time of passage at a touch point from the authentication history information DB 13 by using the token ID included in the passage history information as a key (step S703).

Next, the management server 10 acquires operation information including attribute information on the user U from the operation information DB 14 by using the token ID included in the passage history information as a key (step S704).

Next, the management server 10 performs a statistics analysis process on the passage history information, the authentication history information, and the operation information (attribute information) (step S705). The management server 10 performs a statistics process for each touch point, for each attribute of the user U, or for each period, for example.

Then, in response to acquiring a display condition for a statistics analysis result designated by the manager or the like (step S706), the management server 10 displays the statistics analysis result on the operation terminal 22 or a terminal used for display (not illustrated) (step S707).

Figure 21:
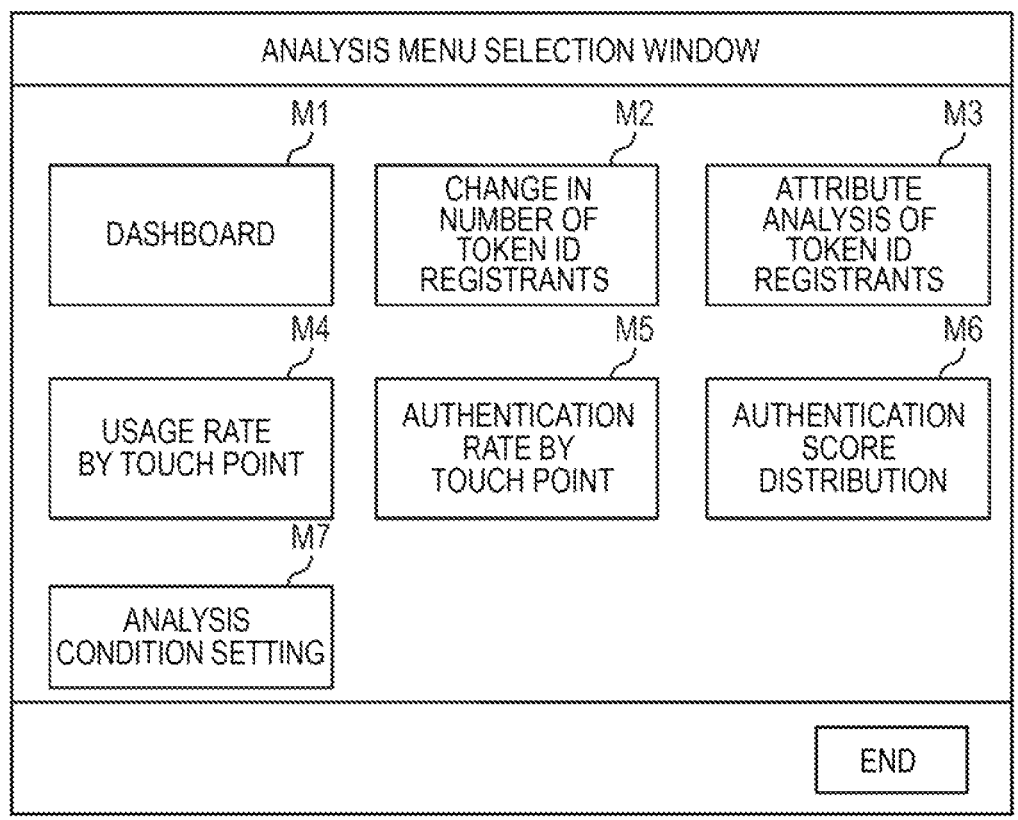
FIG. 21 is a diagram illustrating one example of a window output by the management server in the first example embodiment.

FIG. 21 to FIG. 26 are diagrams illustrating one example of a window output by the management server 10. FIG. 21 illustrates an analysis menu selection window used on which a system manager selects an analysis result to be displayed. In the center region of the window, a plurality of analysis menus M1 to M6 and an analysis condition set button M7 by which the window is changed to a window used for setting an analysis condition are displayed.

Figure 22:
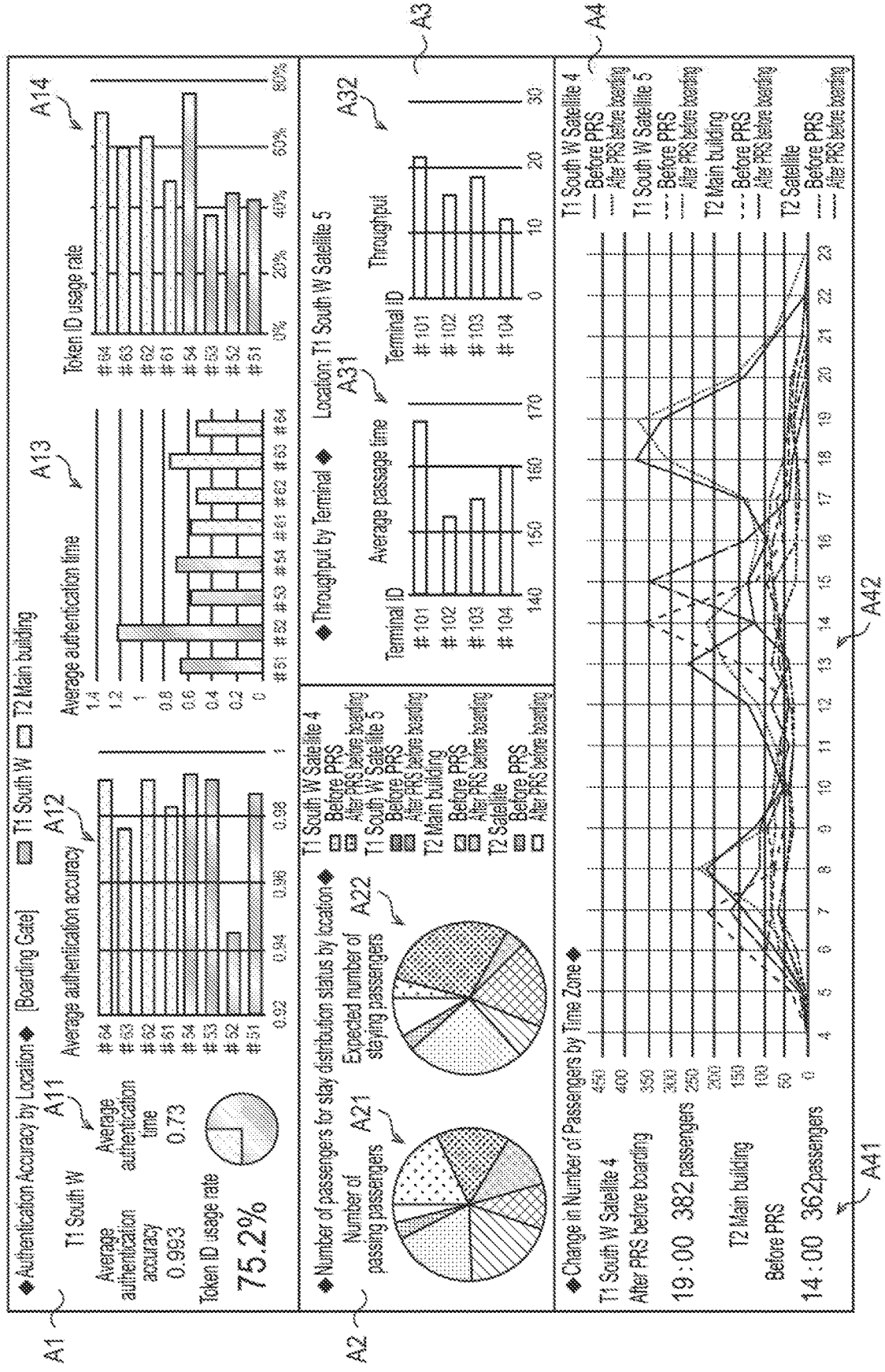
FIG. 22 is a diagram illustrating one example of a window output by the management server in the first example embodiment.

FIG. 22 is a dashboard window in which different types of statistics results are displayed all together in a dashboard form. The dashboard window illustrated in FIG. 21 is substantially formed of four regions A1 to A4. The region A1 indicates results in which the authentication accuracy is statistically analyzed for each location.

The region A1 is formed of regions A11 to A14. The region A11 displays the average authentication accuracy, the average authentication time, and the token ID usage rate for a location ("T1 South W"). The "token ID usage rate" has the same meaning as a usage rate of biometric authentication. Addition of the number of records of history information (first history information) on a procedure with biometric authentication (that is, the number of users of biometric authentication) N1 and the number of records of usage information on a procedure with reading of the recording medium (that is, the number of users of a medium) N2 results in the total number of passengers N3. Thus, when the token ID usage rate is denoted as R, R=N1/(N1+N2) can be calculated.

The region A12 displays the average authentication accuracy on a terminal ID basis. The region A13 displays the average authentication time on a terminal ID basis. The region A14 displays the token ID usage rate on a terminal ID basis. Note that, in A12 to A14, the locations of the terminal ID of "#51" to "#54" are "T1 South W", and the locations of the terminal ID of "#61" to "#64" are "T2 Main building".

In the region A11, the region A12, and the region A13, a terminal which does not satisfy a predetermined threshold may be detected and displayed with emphasis. For example, in the region A12, the terminal whose terminal ID is "#52" can be detected as a terminal in which the average authentication accuracy is less than a threshold of 0.96. Further, process results of biometric authentication (authentication accuracy, authentication time, and authentication success rates) may be aggregated and output on a location basis. Then, when the average authentication accuracy on a location (arrangement place) basis does not satisfy a predetermined threshold, the information on such a location may be output.

In the region A13, the terminal whose terminal ID is "#52" can be detected as a terminal in which the average authentication time exceeds a threshold of 1 second. Similarly, when the authentication success rates are displayed on a terminal basis in the region A1, a terminal in which the authentication success rate is less than a predetermined threshold can be detected and displayed with emphasis.

The region A2 indicates results obtained by statistically analyzing the distribution status of the number of staying passengers for each location. The region A2 is formed of a region A21 and a region A22. The region A21 displays the number of passing passengers in a form of a pie graph. The region A22 displays the number of expected staying passengers in a form of a pie graph.

The region A3 indicates results obtained by statistically analyzing the average passage time and the throughput of a terminal for each device. The region A3 is formed of a region A31 and a region A32. The region A31 displays the average passage time on a terminal ID basis in a form of a bar graph. The region A32 displays the throughput on a terminal ID basis in a form of a bar graph.

The region A4 indicates results obtained by statistically analyzing the number of passengers for each time zone. In the region A4, the number of passengers is categorized by before and after the security inspection site (PRS) and by location in the touch point P3 (T1 South W Satellite 4/T1 South W Satellite 5/T2 Main building/T2 Satellite). Further, the region A4 is formed of the regions A41 and A42. The region A41 displays the number of passengers for each time zone in two locations (T1 South W Satellite 4/T2 Main building). Further, the region A42 displays data of change in the number of passengers for each time zone and for each location with eight types of polygonal lines.

Figure 23:
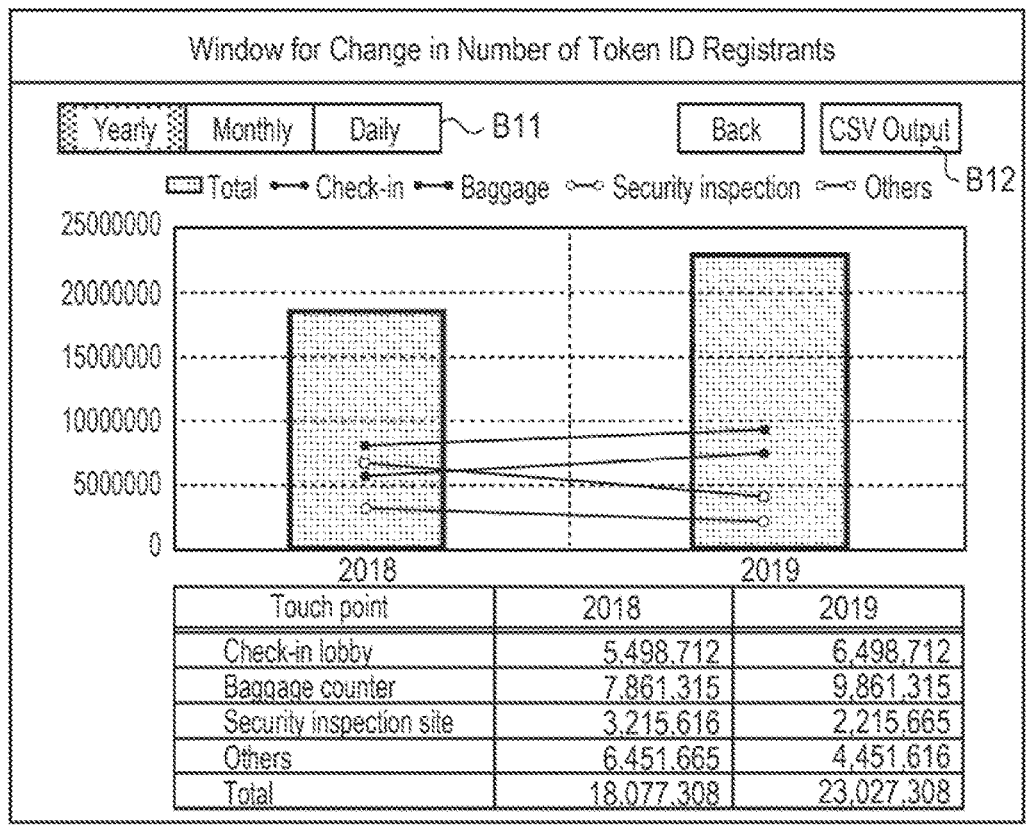
FIG. 23 is a diagram illustrating one example of a window output by the management server in the first example embodiment.

FIG. 23 is a window for change in the number of token ID registrants illustrating a change in the number of registrants of token IDs. In the upper part of the window, a button B11 used for switching the statistics period of data between a yearly basis, a monthly basis, and a daily basis and a button B12 used for outputting a statistics result as a CSV file are displayed. In this example, the button B11 of a yearly basis is selected. Further, in the center part of the window, the number of registrants in a period of years from 2018 to 2019 is displayed in a bar graph, and the numbers of registrants for respective touch points are displayed in a polygonal line graph and a list table. Note that, although FIG. 23 displays all the legends, it is possible to provide a button used for selecting a touch point and display only the change in the number of registrants for the selected touch point.

Figure 24:
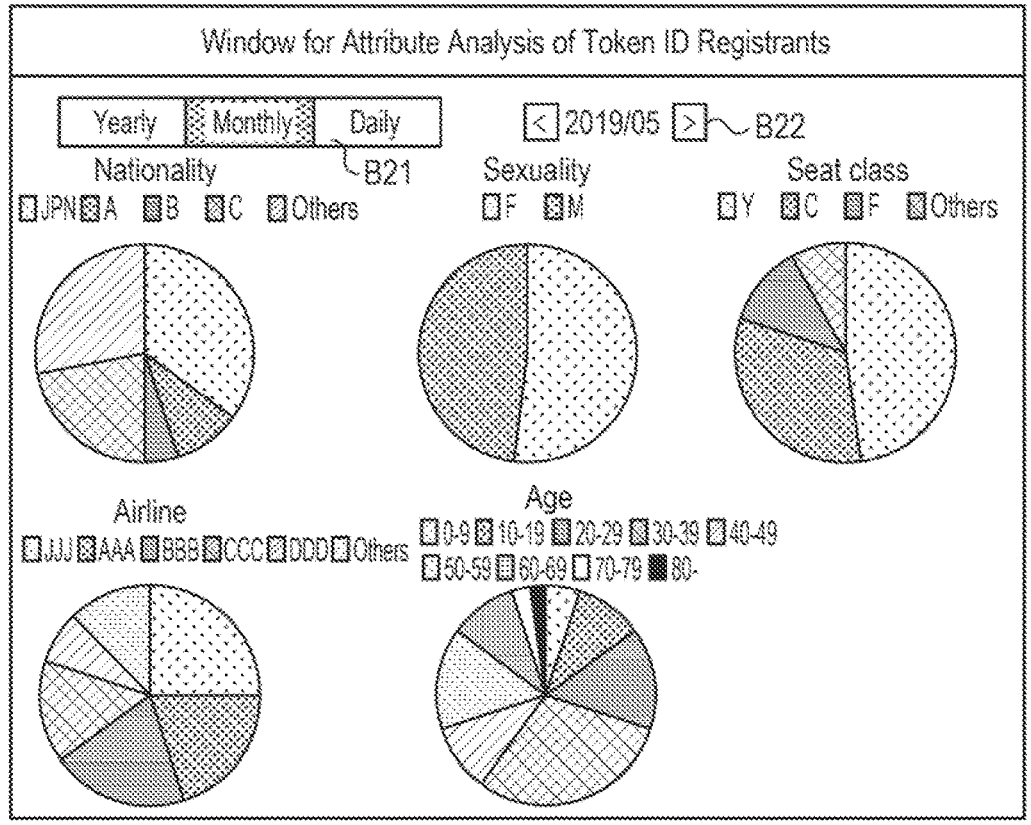
FIG. 24 is a diagram illustrating one example of a window output by the management server in the first example embodiment.

FIG. 24 is a window for attribute analysis of token ID registrants in which the number of registrants of token IDs is analyzed for each attribute of the user U. In the upper part of the window, a button B21 used for switching the statistics period of data between a yearly basis, a monthly basis, and a daily basis is displayed. In this example, a monthly basis is selected. Further, a button B22 used for switching the display period is displayed next to the button B21. Further, in the center part of the window, the analysis results for each nationality, for each sexuality, for each seat class, for each airline, and for each age are displayed in pie graphs, respectively. Note that not only attribute information but also an analysis result using boarding information (for example, an analysis result for each destination) may be displayed.

Figure 25:
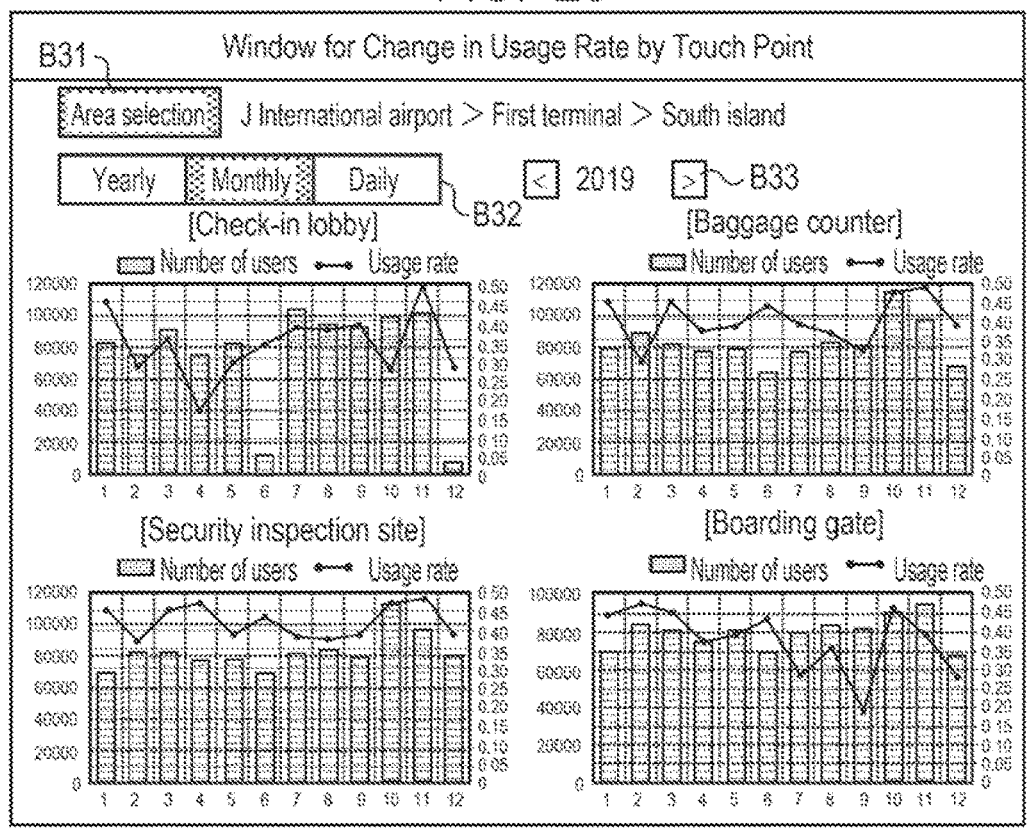
FIG. 25 is a diagram illustrating one example of a window output by the management server in the first example embodiment.

FIG. 25 is a window for change in usage rate for each touch point in which the usage rate of biometric authentication is analyzed for each touch point. In the upper part of the window, an area selection button B31 used for selecting a touch point and a button B32 used for switching the statistics period of data between a yearly basis, a monthly basis, and a daily basis is displayed. In this example, a monthly basis is selected. Further, a button B33 used for switching the display period is displayed next to the button B32. In the center part of the window, the respective numbers of biometric authentication users (the number of users) at four touch points (the check-in lobby, the baggage drop-off site, the security inspection site, and the boarding gate) are displayed in bar graphs, and respective usage rates of biometric authentication at the four touch points are displayed in polygonal line graphs. For example, as the usage rate of biometric authentication, the ratio of the number of passengers actually using biometric authentication out of the number of passengers registering biometric information used for the boarding procedure (the number of passengers whose token IDs are issued) may be indicated. Further, the ratio of the number of passengers using biometric authentication out of the total number of passengers may be indicated.

Figure 26:
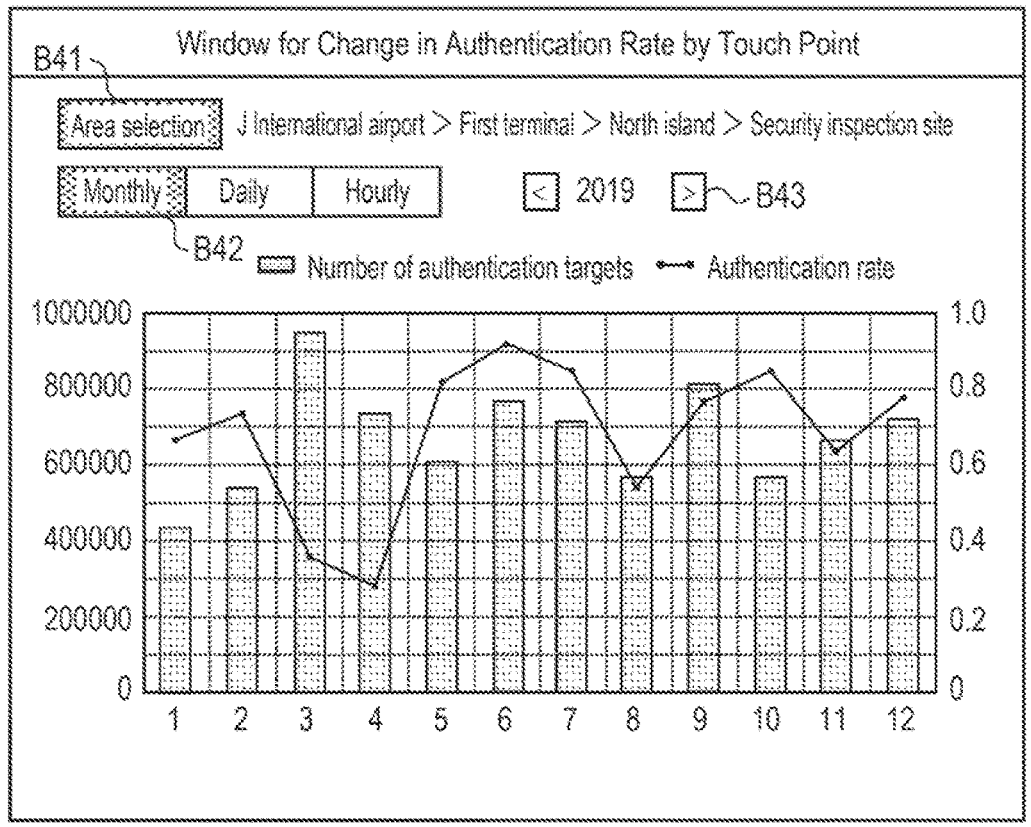
FIG. 26 is a diagram illustrating one example of a window output by the management server in the first example embodiment.

FIG. 26 is a window for change in the authentication rate by touch point in which the authentication rate (authentication success rate) of biometric authentication is analyzed for each touch point. In the upper part of the window, an area selection button B41 used for selecting a touch point and a button B42 used for switching the statistics period of data between a monthly basis, a daily basis, and an hour basis is displayed. In this example, a monthly basis is selected. Further, a button B43 used for switching the display period is displayed next to the button B42. In the center part of the window, the total number of authentication targets in the security inspection site is displayed in a bar graph, and the authentication rate of biometric authentication is displayed in a polygonal graph.

According to the present example embodiment, the management server 10 can recognize the usage status of biometric authentication of the users U from various points of view by statistically analyzing history information (token ID information, passage history information, authentication history information, and operation information) registered in databases when the users U have performed respective procedures at respective touch points based on biometric authentication for boarding airplanes. Accordingly, it is possible to facilitate use of biometric authentication in procedures at respective touch points.

Second Example Embodiment

The information processing system 1 in the present example embodiment will be described below. Note that references common to the references provided in the drawings of the first example embodiment indicate the same object. Description of features common to the first example embodiment will be omitted, and different features will be described in detail.

The present example embodiment is different from the first example embodiment in that the management server 10 further has a function of creating a learning model based on token ID information, passage history information, authentication history information, and operation information, applying new data to the learning model, and performing a simulation of a throughput or a proposal of the optimal layout or number of installations. That is, in the present example embodiment, the CPU 101 of the management server 10 also functions as a learning unit and a prediction unit.

As one example of a learning method in the management server 10, a general deep learning framework such as TensorFlow, Caffe2, PyTorch, or the like can be used for learning.

Figure 27:
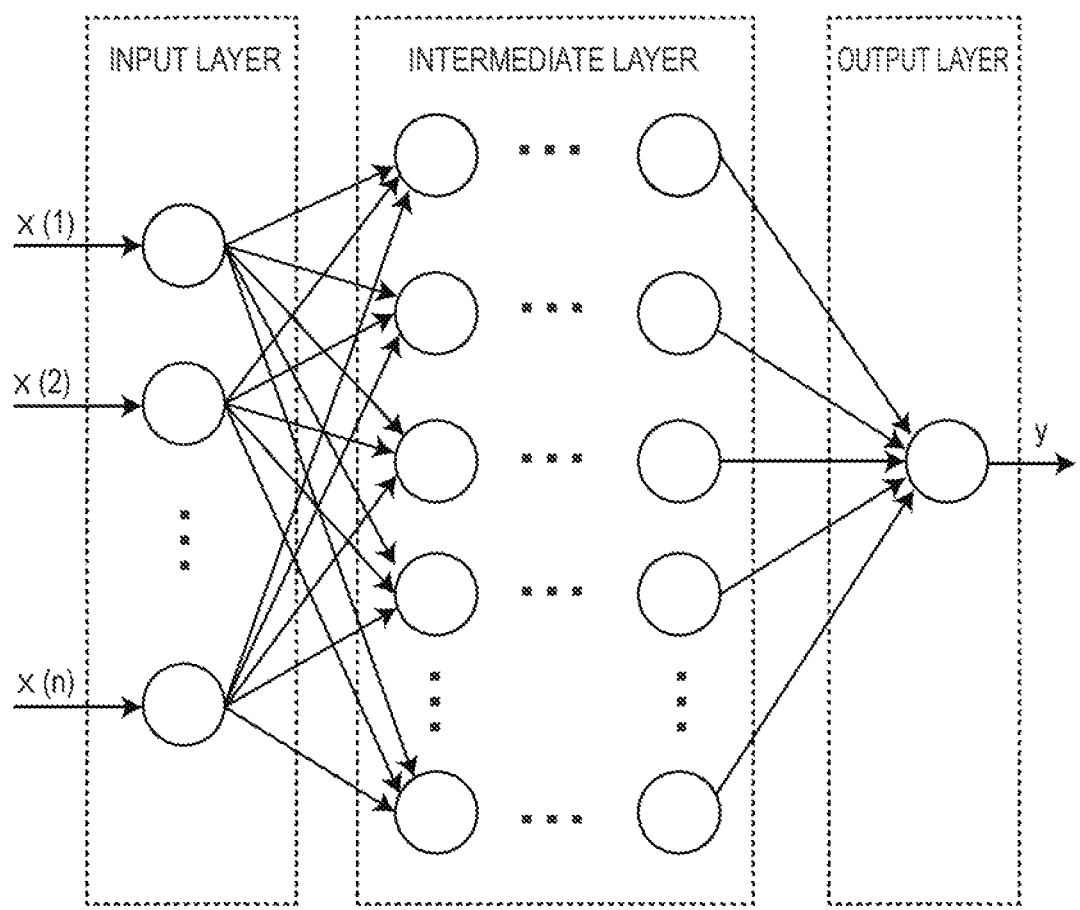
FIG. 27 is a schematic diagram illustrating a neural network used in a learning process in a second example embodiment.

FIG. 27 is a schematic diagram illustrating a neural network used in a learning process in the present example embodiment. The neural network illustrated in FIG. 27 has an input layer having a plurality of nodes, an intermediate layer having a plurality of nodes, and an output layer having a single node. For example, the number of passengers who have passed through each touch point in a predetermined period, the number of installations of terminals at each touch point at a procedure, a passage time, and the like are input to each node of the input layer. Each node of the intermediate layer is connected to each node of the input layer. Each element of an input value input to a node of the intermediate layer is used for calculation in each node of the intermediate layer. Each node of the intermediate layer calculates a calculation value by using an input value input from each node of the input layer, a predetermined weighting coefficient, and a predetermined bias value, for example. Each node of the intermediate layer is connected to the output layer and outputs the calculated calculation value to the node of the output layer. Calculation values from respective nodes of the intermediate layer are input to the node of the output layer.

The node of the output layer calculates a processing time (estimation value) at each touch point by using calculated values input from respective nodes of the intermediate layer, a weighting coefficient, and a bias value. Note that, for example, a back propagation method is used when a neural network is trained. Specifically, an output value obtained when data is input to the input layer is compared with an output value obtained from training data, and an error resulted from the comparison is fed back to the intermediate layer. This is repeated until the error becomes below a predetermined threshold.

With such a learning process, when any number of passengers is input to the neural network (learning model), a predicted processing time at each touch point can be output at high accuracy. Note that a learning model created by the learning process is not limited to that described above.

Figure 28:
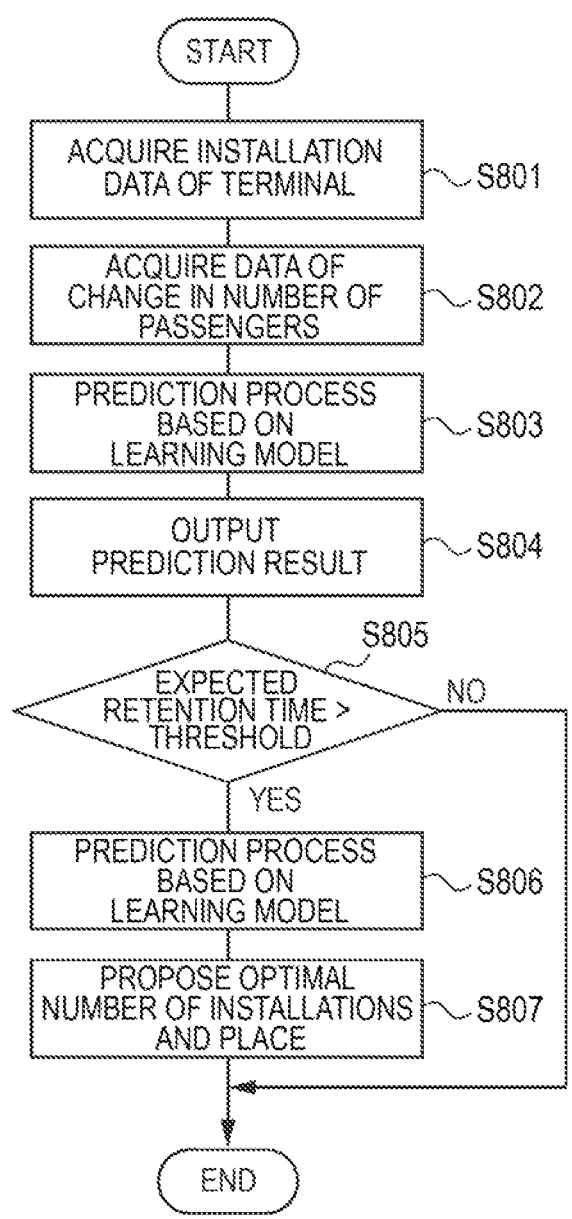
FIG. 28 is a flowchart illustrating one example of the process in the management server in the second example embodiment.

FIG. 28 is a flowchart illustrating one example of the process in the management server 10. This process is performed in order that the system manager or the like recognizes the usage status of biometric authentication in an airport.

First, the management server 10 acquires installation data of terminals (step S801) and acquires data of change in the number of passengers (step S802).

Next, the management server 10 performs a prediction process based on a learning model (step S803) and then outputs a prediction result (step S804).

Next, the management server 10 references the prediction result and determines whether or not the predicted retention time of passengers at each touch point exceeds a predetermined threshold (step S805). In the present example embodiment, the predicted retention time of passengers is considered to be the same as the predicted processing time of a terminal apparatus. Herein, if it is determined that the predicted retention time exceeds the predetermined threshold (step S805, YES), the process proceeds to step S806. Contrarily, if it is determined that the predicted retention time does not exceed the predetermined threshold (step S805, NO), the process of FIG. 28 ends.

In step S806, installation data in which the number of installations of terminals has been changed is applied to the learning model, and the prediction process based on the learning model is repeatedly performed. For example, the number of installations is decremented and input to the learning model, and the number of installations when the predicted retention time corresponding to the number of passengers becomes less than the threshold is calculated.

The management server 10 then displays a proposal window to propose the optimal number of installations and places (step S807) and ends the process of FIG. 28.

Figure 29:
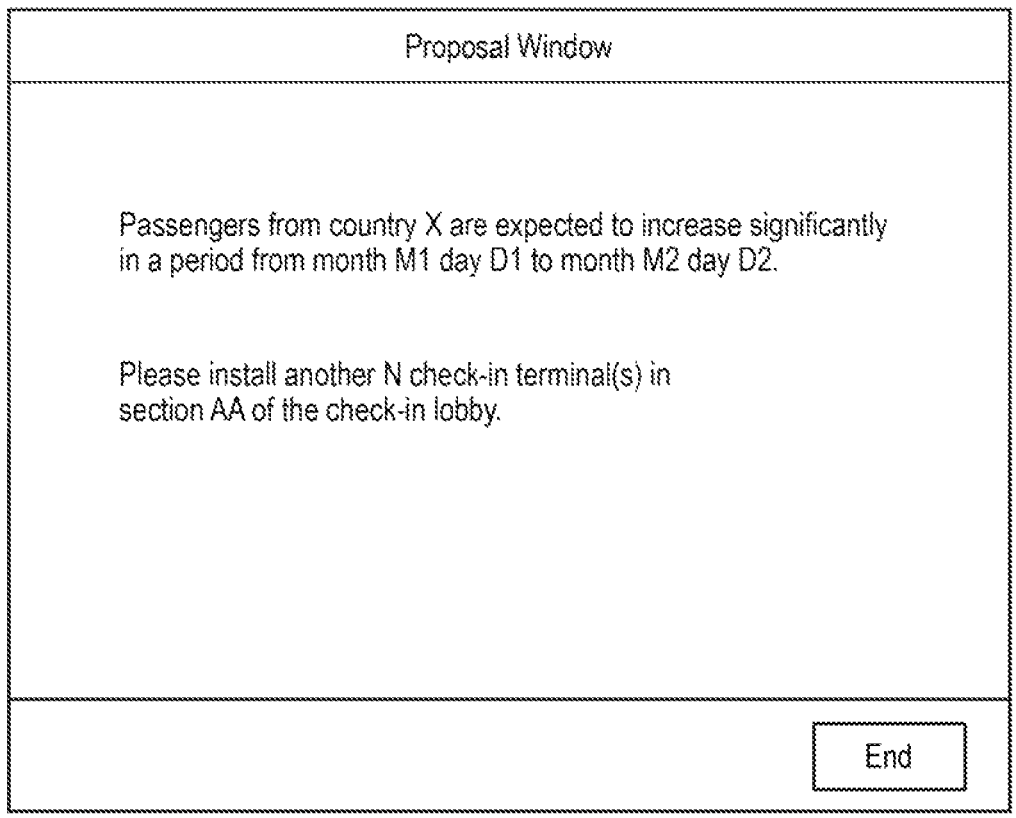
FIG. 29 is a diagram illustrating one example of a window output by the management server in the second example embodiment.

FIG. 29 is a diagram illustrating one example of a window output by the management server 10. FIG. 29 is a proposal window to propose the optimal number of installations of terminal apparatuses that perform biometric authentication. In the center part of the window, a proposal message based on the analysis process performed by the management server 10 ("Passengers from country X are expected to increase significantly in a period from month M1 day D1 to month M2 day D2. Please install another N check-in terminal(s) in section AA of the check-in lobby.") is displayed. Note that, in addition to such display, a map of the area of interest in an airport may be displayed, and a place for which the number of installations is proposed may be displayed with emphasis.

As described above, according to the present example embodiment, the management server 10 can create a learning model based on history information on passengers and predict a predicted retention time (predicted processing time) of passengers in the airport based on the learning model. Further, the management server 10 can propose the number of terminal apparatuses which are to be installed at each touch point and have a biometric authentication function based on the prediction result.

Third Example Embodiment

Figure 30:
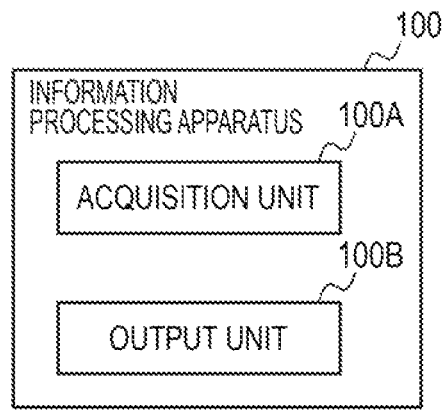
FIG. 30 is a block diagram illustrating a general configuration example of an information processing apparatus in a third example embodiment.

FIG. 30 is a block diagram illustrating the whole configuration example of an information processing apparatus 100 in the present example embodiment. The information processing apparatus 100 includes an acquisition unit 100A and an output unit 100B. The acquisition unit 100A acquires first history information indicating that a procedure related to boarding of a passenger in an airport was performed with biometric authentication and second history information indicating that the procedure was performed with reading of a medium. The output unit 100B outputs the usage status of the biometric authentication in the procedure based on the first history information and the second history information. According to the information processing apparatus 100 in the present example embodiment, it is possible to facilitate use of biometric authentication in procedures related to boarding of passengers.

Modified Example Embodiments

Although the present invention has been described above with reference to the example embodiments, the present invention is not limited to the example embodiments described above. Various modifications that may be appreciated by those skilled in the art can be made to the configuration and details of the present invention within the scope not departing from the spirit of the present invention. For example, it should be understood that an example embodiment in which a part of the configuration of any of the example embodiments is added to another example embodiment or an example embodiment in which a part of the configuration of any of the example embodiments is replaced with a part of the configuration of another example embodiment is also one of the example embodiments to which the present invention may be applied.

Further, the configuration of the present invention is applicable not only to an international flight but also to a domestic flight. In the case of a domestic flight, a 1:1 matching process between a passport face image and a captured face image in addition to an immigration procedure may be omitted. In such a case, for example, a captured face image at the time of purchasing a boarding ticket can be used as a registered biometric image. When a terminal such as a smartphone or a personal computer is used to purchase a boarding ticket or perform check-in online, if a face image captured by a terminal is registered, the user can also board an airplane through face authentication at the airport A.

Although the check-in terminal 20 reads a passport face image from a passport and thereby issuance of a token ID is applied to the management server 10 in the first example embodiment described above, such issuance may be applied to the automatic baggage drop-off machine 30 or the security inspection apparatus 40 taking a case of an online check-in procedure into consideration. That is, the management server 10 acquires a passport face image and a target biometric image from any one of an operation terminal that performs the operation related to the time of departure of the user U. Issuance of a token ID may be applied in a first performed procedure operation out of a series of procedure operations performed at the time of departure. In such a case, the process in the automatic baggage drop-off machine 30 or the security inspection apparatus 40 includes a step of acquiring recorded data from a passport and an airline ticket medium, a step of inquiring boarding reservation information from the reservation system 2, or the like in the same manner as in the case of FIG. 14.

Furthermore, the type of a statistics analysis process is not limited to those described above. For example, analysis may be made for a series of procedures related to a certain user U. Specifically, the history information may be acquired from the passage history information DB 12 and the authentication history information DB 13, respectively, by using a token ID of the user U as a key, and a procedure area (touch point) for which passage history information or authentication history information is absent may be detected and analyzed. That is, when the user U completes a procedure by reading of a recording medium such as a boarding ticket at some of the touch points, a touch point for which passage history information is present but authentication history information is absent can be detected. For example, there may be a case where biometric authentication is used at the check-in lobby (touch point P1) and the baggage counter (touch point P2), then, biometric authentication is not used at the security inspection site (touch point P3), and biometric authentication is used at the immigration site (touch point P4) and the boarding gate (touch point P5), and the authentication history at the touch point P3 is thus missed. Similarly, when the operation terminals (22, 32, 42, 52, 62) are used to perform procedures but some registration process of passage history information is not performed, a touch point for which both passage history information and authentication history information are absent can be detected. It is possible to recognize a traffic line of the user U by detecting and analyzing such a missing state of records. As a result, it is also possible to change the layout or the number of installations of terminal apparatuses having a biometric authentication function and facilitate more use of biometric authentication.

The scope of each of the example embodiments further includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself.

As the storage medium, for example, a floppy (registered trademark) disk, a hard disk, an optical disk, a magneto-optical disk, a CD-ROM, a magnetic tape, a nonvolatile memory card, or the like can be used. Further, the scope of each of the example embodiments includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

An information processing apparatus comprising:

an acquisition unit that acquires first history information indicating that a procedure related to boarding of a passenger in an airport was performed with biometric authentication and second history information indicating that the procedure was performed with reading of a medium; and an output unit that outputs usage status of the biometric authentication in the procedure based on the first history information and the second history information.

(Supplementary Note 2)

The information processing apparatus according to supplementary note 1 further comprising an issuance unit that issues a token ID corresponding to registered biometric information on the passenger used for the biometric authentication, wherein the first history information includes information on a procedure area in which the registered biometric information was registered and the token ID, and wherein the output unit outputs the number of registrations of the registered biometric information for each procedure area.

(Supplementary Note 3)

The information processing apparatus according to supplementary note 2, wherein the first history information includes attribute information on the passenger, and wherein the output unit outputs the number of registrations for each attribute information.

(Supplementary Note 4)

The information processing apparatus according to supplementary note 2 or 3, wherein the output unit outputs a usage rate of the biometric authentication in the procedure area based on a ratio of the first history information and the second history information for each procedure area.

(Supplementary Note 5)

The information processing apparatus according to any one of supplementary notes 2 to 4, wherein based on the token ID, the output unit detects, out of a plurality of procedure areas, the procedure area for which the first history information on the same passenger is absent.

(Supplementary Note 6)

The information processing apparatus according to any one of supplementary notes 1 to 5, wherein the first history information includes terminal IDs of terminals used in the biometric authentication and process results of the biometric authentication, and wherein the output unit aggregates and outputs the process results for each of the terminal IDs.

(Supplementary Note 7)

The information processing apparatus according to supplementary note 6, wherein based on the process results for each of the terminal IDs, the output unit detects a terminal in which an authentication success rate is less than a predetermined threshold.

(Supplementary Note 8)

The information processing apparatus according to supplementary note 6 or 7, wherein the first history information further includes information on arrangement places of the terminals in the airport, and wherein the output unit aggregates and outputs the process results for each of the arrangement places.

(Supplementary Note 9)

The information processing apparatus according to supplementary note 8, wherein the output unit outputs information on an arrangement place in which average authentication accuracy obtained by averaging authentication accuracy of the biometric authentication for each of the arrangement places is less than a predetermined threshold.

(Supplementary Note 10)

The information processing apparatus according to any one of supplementary notes 6 to 9 further comprising a prediction unit that outputs a predicted processing time in the procedure based on a learning model in which a relationship of the number of passengers in a predetermined period, the number of installations of terminals, and a required time for the procedure is learned in advance.

(Supplementary Note 11)

The information processing apparatus according to supplementary note 10, wherein the prediction unit outputs information to facilitate a change of the number of installations when the predicted processing time exceeds a predetermined threshold.

(Supplementary Note 12)

The information processing apparatus according to any one of supplementary notes 1 to 11, wherein the output unit outputs different types of statistics analysis results based on the first history information and the second history information in a dashboard form.

(Supplementary Note 13)

An information processing method comprising:
acquiring first history information indicating that a procedure related to boarding of a passenger in an airport was performed with biometric authentication and second history information indicating that the procedure was performed with reading of a medium; and
outputting usage status of the biometric authentication in the procedure based on the first history information and the second history information.

(Supplementary Note 14)

A storage medium storing a program that causes a computer to perform:
acquiring first history information indicating that a procedure related to boarding of a passenger in an airport was performed with biometric authentication and second history information indicating that the procedure was performed with reading of a medium; and
outputting usage status of the biometric authentication in the procedure based on the first history information and the second history information.

REFERENCE SIGNS LIST

NW1, NW2 network
1 information processing system
2 reservation system
3 reservation information DB
10 management server
11 token ID information DB
12 passage history information DB
13 authentication history information DB
14 operation information DB
20 check-in terminal
30 automatic baggage drop-off machine
40 security inspection apparatus
50 automated gate apparatus
60 boarding gate apparatus
22, 32, 42, 52, 62 operation terminal
100 information processing apparatus
100A acquisition unit
100B output unit

The invention claimed is:

1. An information processing apparatus comprising:
a memory configured to store instructions; and
a processor configured to execute the instructions to:
when each of a plurality of passengers sequentially select any of biometric authentication and reading of a medium at ones of a plurality of procedure areas in an airport to perform a plurality of procedures related to boarding, acquire first history information indicating whether a procedure, of the procedures, in a procedure area, of the procedure areas, was performed with the biometric authentication and second history information indicating whether the procedure was performed with reading of the medium; and
output usage status of the biometric authentication in the procedure area corresponding to the plurality of passengers based on the first history information and the second history information for each of the plurality of procedure areas regarding the plurality of the passengers, the usage status further indicating at least one of a model name and an operating system of a device in the procedure area.

2. The information processing apparatus according to claim 1, wherein the processor is further configured to execute the instructions to:
issue a token ID corresponding to registered biometric information on the passenger used for the biometric authentication, wherein the token ID and information on the procedure area in which the registered biometric information was registered are included in the first history information; and
output the number of registrations of the registered biometric information for each procedure area.

3. The information processing apparatus according to claim 2,
wherein the first history information includes attribute information on the passenger, and
wherein the processor is configured to execute the instructions to:
output the number of registrations for each attribute information.

4. The information processing apparatus according to claim 2, wherein the processor is configured to execute the instructions to:
output a usage rate of the biometric authentication in the procedure area based on a ratio of the first history information and the second history information for each procedure area.

5. The information processing apparatus according to claim 2, wherein the processor is configured to execute the instructions to:
detect, based on the token ID, the procedure area for which the first history information on the same passenger is absent out of a plurality of procedure areas.

6. The information processing apparatus according to claim 1,
wherein the first history information includes terminal IDs of terminals used in the biometric authentication and process results of the biometric authentication, and
wherein the processor is configured to execute the instructions to:
aggregate and output the process results for each of the terminal IDs.

7. The information processing apparatus according to claim 6, wherein the processor is configured to execute the instructions to:
detect a terminal in which an authentication success rate is less than a predetermined threshold based on the process results for each of the terminal IDs.

8. The information processing apparatus according to claim 6, wherein the first history information further includes information on arrangement places of the terminals in the airport, and wherein the processor is configured to execute the instructions to:

aggregate and output the process results for each of the arrangement places.

9. The information processing apparatus according to claim 8, wherein the processor is configured to execute the instructions to:

output information on an arrangement place in which average authentication accuracy obtained by averaging authentication accuracy of the biometric authentication for each of the arrangement places is less than a predetermined threshold.

10. The information processing apparatus according to claim 6, wherein the processor is configured to execute the instructions to:

output a predicted processing time in the procedure based on a learning model in which a relationship of the number of passengers in a predetermined period, the number of installations of terminals, and a required time for the procedure is learned in advance.

11. The information processing apparatus according to claim 10, wherein the processor is configured to execute the instructions to:

output information to facilitate a change of the number of installations when the predicted processing time exceeds a predetermined threshold.

12. The information processing apparatus according to claim 1, wherein the processor is configured to execute the instructions to:

output different types of statistics analysis results based on the first history information and the second history information in a dashboard form.

13. An information processing method comprising:

when each of a plurality of passengers sequentially select any of biometric authentication and reading of a medium at ones of a plurality of procedure areas in an airport to perform a plurality of procedures related to boarding, acquiring first history information indicating whether a procedure, of the procedures, in a procedure area, of the procedure areas, was performed with the biometric authentication and second history information indicating whether the procedure was performed with reading of the medium; and outputting usage status of the biometric authentication in the procedure area corresponding to the plurality of passengers based on the first history information and the second history information for each of the plurality procedure areas regarding the plurality of the passengers, the usage status further indicating at least one of a model name and an operating system of a device in the procedure area.

14. A non-transitory storage medium storing a program that causes a computer to perform:

when each of a plurality of passengers sequentially select any of biometric authentication and reading of a medium at ones of a plurality of procedure areas in an airport to perform a plurality of procedures related to boarding, acquiring first history information indicating whether a procedure, of the procedures, in a procedure area, of the procedure areas, was performed with the biometric authentication and second history information indicating whether the procedure was performed with reading of the medium; and outputting usage status of the biometric authentication in the procedure area corresponding to the plurality of passengers based on the first history information and the second history information for each of the plurality of procedure areas regarding the plurality of the passengers, the usage status further indicating at least one of a model name and an operating system of a device in the procedure area.

* * * * *